(12) United States Patent
Moriyama et al.

(10) Patent No.: US 9,479,740 B2
(45) Date of Patent: Oct. 25, 2016

(54) IMAGE GENERATING APPARATUS

(71) Applicant: FUJITSU TEN LIMITED, Kobe-shi, Hyogo (JP)

(72) Inventors: Shinichi Moriyama, Kobe (JP); Masahiro Yamada, Kobe (JP); Yasuyoshi Sawada, Kobe (JP); Miki Murasumi, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 559 days.

(21) Appl. No.: 13/965,602

(22) Filed: Aug. 13, 2013

(65) Prior Publication Data
US 2014/0085466 A1    Mar. 27, 2014

(30) Foreign Application Priority Data
Sep. 27, 2012    (JP) .................................. 2012-213889

(51) Int. Cl.
  *H04N 7/18*       (2006.01)
  *G06T 15/50*      (2011.01)
  *B60R 1/00*       (2006.01)
  *G08G 1/16*       (2006.01)

(52) U.S. Cl.
  CPC ........ *H04N 7/18* (2013.01); *B60R 1/00* (2013.01); *G06T 15/503* (2013.01); *G08G 1/165* (2013.01); *G08G 1/166* (2013.01); *B60R 2300/60* (2013.01); *B60R 2300/607* (2013.01)

(58) Field of Classification Search
  None
  See application file for complete search history.

(56) References Cited

U.S. PATENT DOCUMENTS

| | | | | |
|---|---|---|---|---|
| 2007/0097206 | A1* | 5/2007 | Houvener | G03B 35/08 348/26 |
| 2008/0150965 | A1* | 6/2008 | Bischoff | G02B 27/01 345/632 |
| 2011/0242320 | A1* | 10/2011 | Yamada | B60Q 1/04 348/148 |

FOREIGN PATENT DOCUMENTS

| | | |
|---|---|---|
| JP | 2002-029349 A | 1/2002 |
| JP | 2003-244688 A | 8/2003 |
| JP | 2003-319383 A | 11/2003 |
| JP | 2004-336613 A | 11/2004 |
| JP | A-2005-184142 | 7/2005 |
| JP | 2006-171849 A | 6/2006 |
| JP | A-2007-158426 | 6/2007 |
| JP | 2008-308076 A | 12/2008 |
| JP | 2009-265803 A | 11/2009 |
| JP | A-2010-093567 | 4/2010 |

(Continued)

OTHER PUBLICATIONS

May 6, 2015 Office Action issued in Chinese Application No. 201310311280.3.

(Continued)

*Primary Examiner* — Sath V Perungavoor
*Assistant Examiner* — Dakshesh Parikh
(74) *Attorney, Agent, or Firm* — Oliff PLC

(57) ABSTRACT

An image generating apparatus generates a vicinity image including a vehicle and a vicinity of the vehicle viewed from a virtual viewpoint, based on a captured image, and generates a combined image by superimposing a vehicle image of the vehicle on the vicinity image. Then the image generating apparatus generates the vehicle image in a frame style that shows a body frame of the vehicle by frame lines and changes a style form in the frame style in accordance with a predetermined condition.

15 Claims, 16 Drawing Sheets

(56) References Cited

FOREIGN PATENT DOCUMENTS

| JP | A-2010-231276 | 10/2010 |
| JP | 4895940 B2 | 3/2012 |

OTHER PUBLICATIONS

Mar. 15, 2016 Office Action issued in Japanes Patent Application No. 2012-213889.

* cited by examiner

IMAGE GENERATING APPARATUS

BACKGROUND OF THE INVENTION

1. Field of the Invention

The invention relates to a technology that generates and displays an image in a vehicle.

2. Description of the Background Art

Conventionally, an image generating apparatus captures images of a vicinity of a vehicle (hereinafter referred to as "host vehicle" that is driven by a driver, a main user of the vehicle), using a plurality of cameras mounted on the host vehicle, and then generates an image of the vicinity of the host vehicle (hereinafter referred to as "vicinity image") viewed from a virtual viewpoint, based on the captured images. Then, a combined image is generated by superimposing an image of the host vehicle (hereinafter referred to as "host vehicle image") on the vicinity image and the generated combined image is displayed on a display. However, in the generated vicinity image, if an object is existing behind the host vehicle viewed from the virtual viewpoint, an image of the object (hereinafter referred to as "object image") in the combined image is overlapped and hidden behind the host vehicle image. Therefore, there are cases where it is difficult for the user to see the object existing behind the host vehicle viewed from the virtual viewpoint.

On the other hand, there is a technology where an image generating apparatus generates a combined image by superimposing, on a vicinity image, a host vehicle image having a high transparency rate (e.g. 50% or more) or a host vehicle image in a frame style that shows a body frame of the host vehicle by lines. In other words, there is a technology where the image generating apparatus generates the combined image in which the object image is not hidden behind the host vehicle image, and thus the user can see the object existing behind the host vehicle viewed from a virtual viewpoint in the combined image.

However, even if the user can see the object existing behind the host vehicle in the combined image due to the combined image generated by superimposing on the vicinity image the host vehicle image having a high transparency rate or the host vehicle image in the frame style, there are cases where it is difficult to correctly understand an actual distance between the host vehicle and the object. Concretely, when the image generating apparatus generates the combined image by superimposing the host vehicle image having a high transparency rate on the vicinity image, there are cases where the host vehicle image is unclear. As a result, the user cannot fully see the distance between the host vehicle and the object in the image, and thus cannot correctly understand the actual distance between the host vehicle and the object.

Moreover, when the image generating apparatus generates the combined image by superimposing on the vicinity image the host vehicle image in the frame style, the lines are shown in same thickness and a same color for all the body frame of the host vehicle. When the object image is overlapped with the host vehicle image in the combined image, since a portion of the object image is hidden behind the lines of the body frame showing the host vehicle image, depending on thickness of the lines, there are cases where it is difficult for the user to fully see the distance between the host vehicle image and the object image in the combined image.

Furthermore, the same color is used for all the lines to show the body frame. Therefore, the user cannot quickly distinguish a portion of the body frame of the host vehicle image that a particular line represents. As a result, there are cases where it is difficult for the user to correctly understand the actual distance between the host vehicle and the object.

SUMMARY OF THE INVENTION

According to one aspect of the invention, an image generating apparatus includes: an obtaining part that obtains a captured image captured by a camera mounted on a vehicle; and a generator that generates a vicinity image including the vehicle and a vicinity of the vehicle viewed from a virtual viewpoint, based on the captured image, and that generates a combined image by superimposing a vehicle image of the vehicle on the vicinity image, and the generator generates the vehicle image in a frame style that shows a body frame of the vehicle by frame lines and changes a style form in the frame style in accordance with a predetermined condition.

A user can recognize the host vehicle image and an object image separately, can see a distance between the host vehicle image and the object image, regardless of a position of the object, and thus can correctly understand an actual distance between the host vehicle and the object.

According to another aspect of the invention, the generator generates the vehicle image in one style form selected in accordance with a user operation performed by a user of the vehicle, from amongst a plurality of the style forms which differ from each other in thickness of the frame lines.

By changing thickness of the frame lines of the host vehicle image, the user can correctly understand the actual distance between the host vehicle and the object.

According to another aspect of the invention, the generator generates the vehicle image in the frame style or in a real image style, in accordance with a location of the virtual viewpoint.

Regardless of the position of the virtual viewpoint of the combined image, the host vehicle image is shown in the combined image in a style easy for the user to recognize the shape of the host vehicle. Thus the user can correctly understand the actual distance between the host vehicle and the object.

Therefore, an object of the invention is to provide a technology with which a user can correctly understand an actual distance between a host vehicle and an object when a combined image generated by superimposing a host vehicle image on a vicinity image is displayed These and other objects, features, aspects and advantages of the invention will become more apparent from the following detailed description of the invention when taken in conjunction with the accompanying drawings.

DESCRIPTION OF THE EMBODIMENTS

Embodiments of the invention are hereinafter described, with reference to the drawings.

1. First Embodiment 1-1. Configuration

Figure 1:
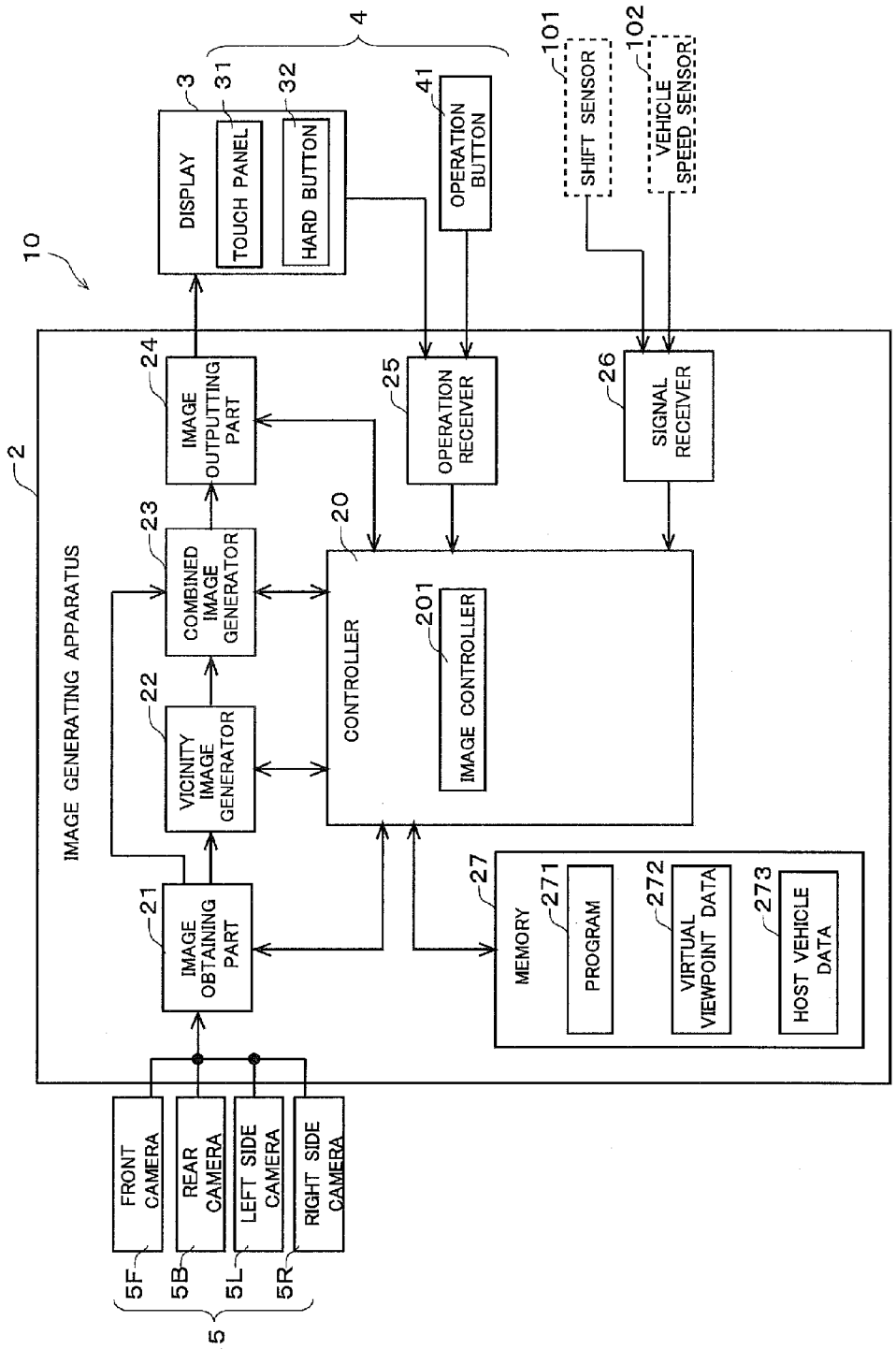
FIG. 1 is a diagram illustrating a configuration of an image display system.

FIG. 1 is a diagram illustrating a configuration of an image display system 10. The image display system 10 is used in a vehicle (a car in this embodiment and hereinafter referred to as "host vehicle" that is driven by a driver, a main user of the vehicle). The image display system 10 has a function of generating an image showing a vicinity of the host vehicle (hereinafter referred to as "vicinity image") and of displaying the generated image in a cabin of the host vehicle. A user (typically driver) of the image display system 10 can understand situations in the vicinity of the host vehicle in real time by using the image display system 10.

As shown in FIG. 1, the image display system 10 includes a plurality of cameras 5, an image generating apparatus 2, a display 3, and an operation button 41. Each of the plurality of cameras 5 obtains a captured image by capturing an image of the vicinity of the host vehicle and inputs data of the obtained captured image to the image generating apparatus 2. The image generating apparatus 2 generates a combined image that is the vicinity image including a vehicle image of the host vehicle (hereinafter referred to as "host vehicle image"), described later, using the captured image showing the vicinity of the host vehicle. The display 3 displays the combined image generated by the image generating apparatus 2. Moreover, the operation button 41 is used when the user causes the image generating apparatus 2 to perform a function. When receiving a user operation, the operation button 41 sends an operation signal to an operation receiver 25, described later.

Each of the plurality of cameras 5 includes a lens and an image sensor and obtains the data of the capture image showing the vicinity of the host vehicle. The plurality of cameras 5 include a front camera 5F, a rear camera 5B, a left side camera 5L and a right side camera 5R. Each of the four cameras 5F, 5B, 5L and 5R is disposed in a position different from each other and captures an image of the vicinity of the host vehicle in a direction different from each other.

Figure 2:
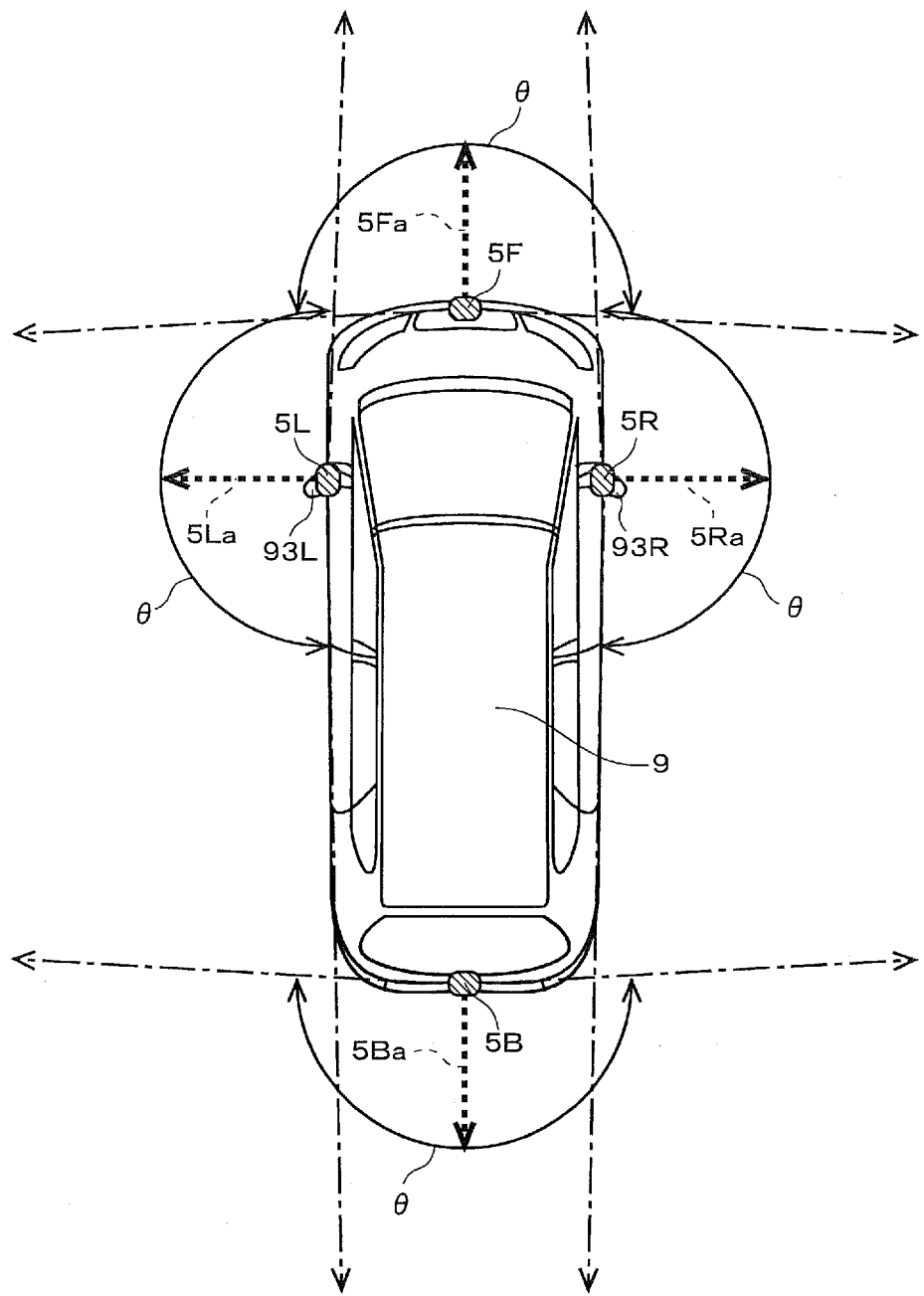
FIG. 2 illustrates directions in which four cameras respectively capture images.

FIG. 2 illustrates directions in which the four cameras 5F, 5B, 5L and 5R respectively capture images. The front camera 5F is disposed on a front end of the host vehicle 9, having an optical axis 5Fa in a straight ahead direction of the host vehicle 9. The rear camera 5B is disposed on a rear end of the host vehicle 9, having an optical axis 5Ba in a direction opposite to the straight ahead direction of the host vehicle 9. The left side camera 5L is disposed on a left side mirror 93L of the host vehicle 9, having an optical axis 5La in a left direction (a direction orthogonal to the straight ahead direction) of the vehicle 9. Moreover, the right side camera 5R is disposed on a right side mirror 93R of the host vehicle 9, having an optical axis 5Ra in a right direction (a direction orthogonal to the straight ahead direction) of the vehicle 9.

Since a wide-angle lens such as a fish-eye lens is used for each of the cameras 5F, 5B, 5L and 5R, each of the cameras 5F, 5B, 5L and 5R has an angle of view θ of 180 degrees or more. Therefore, it is possible to capture images covering 360-degree vicinity of the host vehicle 9 by using the four cameras 5F, 5B, 5L, and 5R.

With reference back to FIG. 1, the display 3 includes, for example, a thin display panel, such as a liquid crystal display, and displays different types of information and images. The display 3 is disposed on an instrument panel or another place in the host vehicle 9 so that the user can see a screen of the display 3. The display 3 may be provided in a housing in which the image generating apparatus 2 is provided as one unit, or the display 3 may be an apparatus separated from the image generating apparatus 2. The display 3 includes a touch panel 31 placed on the display panel and a hard button 32 in a vicinity of an outer rim of the display panel to receive a user operation.

The operation button 41 is an operation receiving member that receives the user operations. The operation button 41 is disposed, for example, on a steering wheel of the host vehicle 9, and receives operations mainly from the driver. The user can operate the image display system 10 via the operation button 41, the touch panel 31 and the hard button 32 of the display 3. The operation button 41, the touch panel 31 and the hard button 32 of the display 3 are hereinafter referred to collectively as an operation part 4. When a user operation is performed via the operation part 4, the operation signal representing a content of the user operation is input to the image generating apparatus 2.

The image generating apparatus 2 is an electronic apparatus capable of different types of image processing, and includes an image obtaining part 21, a vicinity image generator 22, a combined image generator 23 and an image outputting part 24.

The image obtaining part 21 obtains the data of the captured images respectively captured by the four cameras 5F, 5B, 5L and 5R. The image obtaining part 21 includes an image processing function, such as a function of converting an analog captured image to a digital captured image. The image obtaining part 21 performs a predetermined image processing to the obtained captured images and then inputs data of the processed captured images to the vicinity image generator 22 and the combined image generator 23.

The vicinity image generator 22 combines the plural captured images captured by the plurality of cameras 5 and generates the vicinity image showing the situations in the vicinity of the host vehicle 9 viewed from a virtual viewpoint. The virtual viewpoint is, for example, a viewpoint to look down the host vehicle 9 from the outside of the host vehicle 9 or a viewpoint to look a blind area of the driver in the vicinity of the host vehicle 9. Moreover, the vicinity image generator 22 generates the host vehicle image that is the vehicle image of the host vehicle 9 to be superimposed on the vicinity image.

Herein, the host vehicle image is the vehicle image that is generated as an image of a polygonal model of the host vehicle 9, described later, viewed from one virtual viewpoint. The plural polygonal models of the host vehicle 9 are stored in a memory 27 as host vehicle data 273. Specifically, the polygonal models of the host vehicle 9 are models of the host vehicle 9 configured in three dimensions by plural polygons. Concretely, the polygonal models include a model in a real image style that shows a real image of the host vehicle 9 at 0% transparency rate and a model in a frame style that shows a body frame of the host vehicle by frame lines. There are plural forms of the frame style which differ from each other in thickness of the frame lines, as described later. In accordance with a predetermined condition, such as a choice by the user, the host vehicle data 273 is retrieved from the memory 27, and the host vehicle image is generated based on a retrieved polygonal model.

The combined image generator 23 generates the combined image by superimposing the host vehicle image on the vicinity image generated by the vicinity image generator 22, and inputs the combined image to the image outputting part 24. Moreover, the combined image generator 23 obtains the captured image captured by one of the plurality of cameras 5 via the image obtaining part 21 and outputs the obtained captured image to the image outputting part 24.

The image outputting part 24 outputs the combined image mainly generated by the combined image generator 23, to the display 3. As a result, the display 3 displays the combined image as one display image. Moreover, the image outputting part 24 outputs a captured image to the display 3 in addition to the combined image. As a result, the display 3 displays plural images of the combined image and the captured image, as one display image. Thus, the display image showing the vicinity of the host vehicle 9 viewed from the virtual view point is displayed on the display 3.

The image generating apparatus 2 further includes a controller 20, the operation receiver 25, a signal receiver 26 and the memory 27. The controller 20 is, for example, a microcomputer including a CPU, a RAM, a ROM, etc., and comprehensively controls the entire image generating apparatus 2.

The operation receiver 25 receives the operation signal output from the operation part 4 when a user operation is performed. Thus, the operation receiver 25 receives the user operation. The operation receiver 25 outputs the received operation signal to the controller 20.

The signal receiver 26 receives a signal from an apparatus installed in/on the host vehicle 9 separately from the image generating apparatus 2 and inputs the received signal to the controller 20. The signal receiver 26 receives, for example, a signal representing a shift position that is a position of a shift lever of a transmission of the host vehicle 9, from a shift sensor 101. Based on the signal, the controller 20 determines that the host vehicle 9 is moving forward or backwards. Moreover, the signal receiver 26 receives a signal representing a speed of the host vehicle 9 based on revolutions of an axle of the host vehicle 9, from a vehicle speed sensor 102. Based on the signal, the controller 20 obtains information of a current speed of the host vehicle 9.

The memory 27 is, for example, a non-volatile memory, such as a flash memory, and stores different types of information. The memory 27 stores a program 271 as firmware, the vicinity images and different types of data used to generate the combined images and others. Concretely, the memory 27 stores virtual viewpoint data 272 including position coordinates and view directions of a plurality of the virtual viewpoints used to generate the vicinity images. Moreover, the memory 27 stores the host vehicle data 273 including the plural polygonal models used to generate the host vehicle images.

Each function of the controller 20 is realized by arithmetic processing implemented by the CPU in accordance with, for example, the program 271 stored in the memory 27 and the like. In other words, an image controller 201 shown in FIG. 1 is a portion of a function part implemented by the CPU performing the arithmetic processing in accordance with, for example, the program 271.

The image controller 201 mainly controls the vicinity image generator 22 that generates the vicinity images and the combined image generator 23 that generates the combined images. In other words, the image controller 201 controls processing for generating the images, such as, the vicinity images that show the vicinity of the host vehicle 9, the host vehicle images that represent the vehicle image of the host vehicle 9, and the combined images that are generated by superimposing the host vehicle image on the vicinity image.

1-2. Generation of Combined Image

Figure 3:
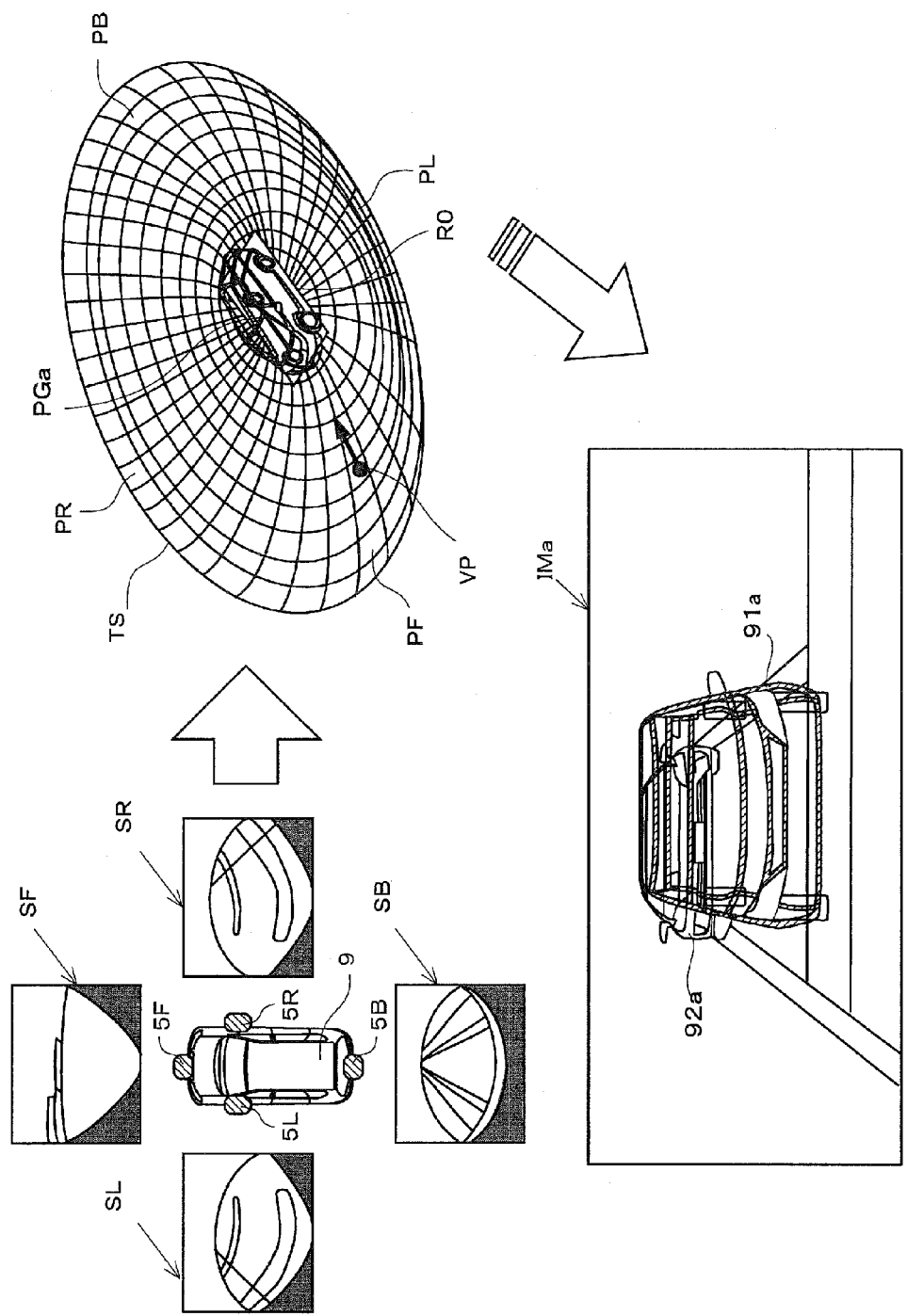
FIG. 3 illustrates methods for generating a vicinity image, a host vehicle image and a combined image.

Next explained are a method used by the vicinity image generator 22 to generate the vicinity images showing the situations in the vicinity of the host vehicle 9 and the host vehicle image viewed from a virtual viewpoint, and a method used by the combined image generator 23 to generate the combined images by superimposing the host vehicle image on the vicinity image. FIG. 3 illustrates the methods for generating the vicinity image, the host vehicle image and the combined image.

When the front camera 5F, the rear camera 5B, the left side camera 5L, and the right side camera 5R mounted on the host vehicle 9 respectively capture images, four captured images SF, SB, SL and SR are captured. The four captured images SF, SB, SL and SR show an area in front of the host vehicle 9, an area behind the host vehicle 9, an area on a left side of the host vehicle 9, and an area on a right side of the host vehicle 9, respectively. Data of the 360-degree vicinity of the host vehicle 9 is included in the four captured images SF, SB, SL and SR.

The vicinity image generator 22 first projects data (value of each pixel) included in the four captured images SF, SB, SL and SR onto a projection surface TS in a virtual three dimensional (3-D) space. The projection surface TS is a virtual 3-D surface corresponding to the vicinity of the host vehicle 9. A center area of the projection surface TS is defined as a vehicle area R0 in which the host vehicle 9 is place in the virtual 3-D space.

The data of the captured images is not projected on the vehicle area R0 of the projection surface TS but is projected on an area outside the vehicle area R0. The area of the projection surface TS on which the data of the captured image is projected (the area outside the vehicle area R0) is hereinafter referred to as "projection target area."

Moreover, in the vehicle area R0, the polygonal model of the host vehicle 9 configured in 3-D by plural polygons (e.g. "thick-line polygonal model PGa" described later with reference to FIG. 4) is placed. In other words, the polygonal model is placed in the center area of a substantial hemisphere defined as a position of the host vehicle 9 in the 3-D space including the projection surface TS. For example, the thick-line polygonal model PGa is retrieved from the host vehicle data 273 in accordance with a user operation for selection and then is placed in the vehicle area R0.

Figure 4:
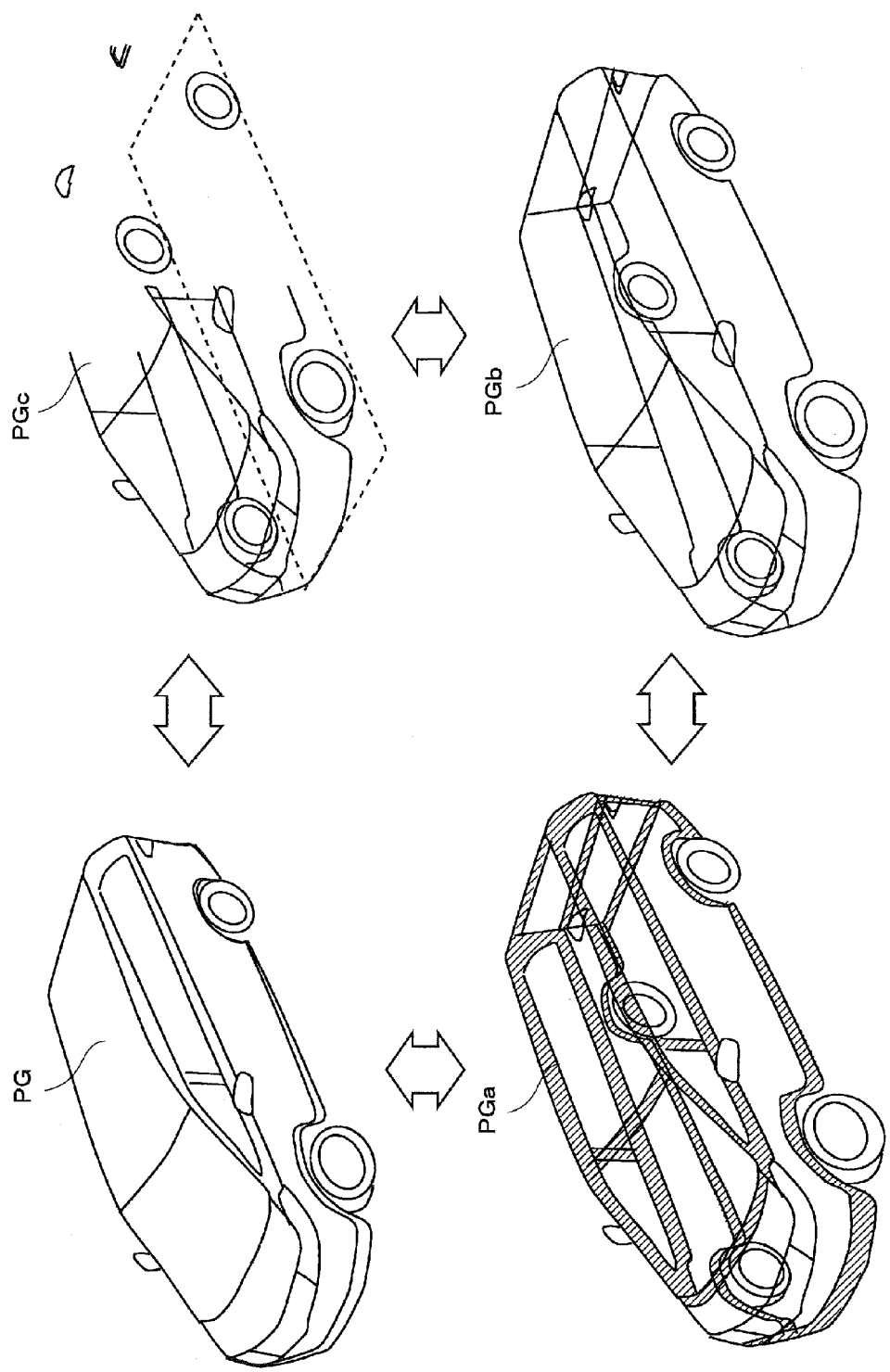
FIG. 4 illustrates plural polygonal models stored as host vehicle data.

The plural polygonal models stored as the host vehicle data 273 are explained here with reference to FIG. 4. FIG. 4 illustrates the plural polygonal models included in the host vehicle data 273. Four polygonal models are illustrated in FIG. 4 as examples. For example, one polygonal model is selected by a user operation performed via the operation part 4. The vicinity image generator 22 generates the host vehicle image based on the selected polygonal model.

Amongst the four polygonal models, a polygonal model PG is shown in the real image style that shows the real image of the host vehicle 9 at 0% transparency rate (hereinafter referred to as "real image polygonal model PG") and is configured in 3-D by the plural polygons. Moreover, each of the plural polygons configuring the real image polygonal model PG is colored in a color corresponding to the real image of the host vehicle 9. Therefore, when the real image polygonal model PG is viewed from an arbitrary virtual viewpoint outside the host vehicle 9 (hereinafter referred to as "arbitrary virtual viewpoint"), an object image of an object existing behind the real image polygonal model PG is not shown in the combined image because the object image is hidden behind the host vehicle image corresponding to the real image polygonal model PG.

Next, the thick-line polygonal model PGa is a polygonal model in the frame style and shows the body frame of the host vehicle 9 by relatively thick lines. Like the real image polygonal model PG, the thick-line polygonal model PGa represents a shape of the host vehicle 9 in 3-D, using the plural polygons. Herein, being different from a case of the real image polygonal model PG, as for the thick-line polygonal model PGa, portions representing the body frame and main parts configuring an outer shape of the host vehicle 9 (e.g. tires, front lights, back lights, side mirrors, etc.) are colored. In other words, a relatively low transparency rate (e.g. 0%) is set for the polygons. Especially, a portion representing the body frame is colored so as to be seen as relatively thick lines.

On the other hand, as for the thick-line polygonal model PGa, portions other than the body frame and the main parts configuring the outer shape of the host vehicle 9 are not colored. In other words, a relatively high transparency rate (e.g. 100%) is set for the portions. Therefore, when the thick-line polygonal model PGa is viewed from the arbitrary virtual viewpoint, the object image of the object existing behind the uncolored portions of the thick-line polygonal model PGa is not hidden behind the host vehicle image in the frame style but is shown in the combined image. Moreover, since the body frame of the thick-line polygonal model PGa is shown by relatively thick lines, the host vehicle image is clear and the user easily understands the shape of the host vehicle 9.

Next, a thin-line polygonal model PGb is a polygonal model in the frame style and shows the body frame of the host vehicle 9 by relatively thin lines. Like the real image polygonal model PG and the thick-line polygonal model PGa, the thin-line polygonal model PGb represents the shape of the host vehicle 9 in 3-D, using the plural polygons. Like the thick-line polygonal model PGa, portions representing the body frame and main parts configuring an outer shape of the host vehicle 9 (e.g. tires, front lights, back lights, side mirrors, etc.) are colored. However, the thin-line polygonal model PGb is different from the thick-line polygonal model PGa in terms of a portion representing the body frame. The portion is colored such that the body frame is shown by relatively thin lines.

Moreover, as for the thin-line polygonal model PGb, portions other than the body frame and the main parts configuring the outer shape of the host vehicle 9 are not colored. Therefore, when the thin-line polygonal model PGb is viewed from the arbitrary virtual viewpoint, the object image of the object existing behind the uncolored portions of the real image polygonal model PG is not hidden behind the host vehicle image in the frame style but is shown in the combined image.

As mentioned above, since the portion representing the body frame of the thin-line polygonal model PGb is shown in relatively thin lines, there are cases where the user does not understand the shape and the like of the host vehicle 9 as easily as the thick-line polygonal model PGa. However, in a case of the thin-line polygonal model PGb, the user more easily understands a position of the object existing behind the host vehicle 9 in the frame style viewed from the virtual viewpoint, as compared with the thick-line polygonal model PGa. Concretely, in the case of the thick-line polygonal model PGa, there are cases where since a portion of the object image is hidden behind the frame lines configuring the host vehicle image, it is difficult for the user to fully see a distance between the host vehicle image and the object image on the screen. However, it is possible to display the object image hidden behind the frame lines configuring the host vehicle image, by changing a style form of the polygonal model in the frame style from the thick-line polygonal model PGa to the thin-line polygonal model PGb in accordance with a selection by the user. Thus, the user can identify the host vehicle image and the object image separately, can see the distance between the host vehicle image and the object image on the screen, and then can correctly understand an actual distance between the host vehicle 9 and the object.

Next explained is a "front-half polygonal model PGc." The front-half polygonal model PGc is a polygonal model in the frame style. The front-half polygonal model PGc shows a front half of the body frame of the host vehicle 9 by relatively thin lines, like the thin-line polygonal model PGb and shows a back half of the body frame of the host vehicle 9 by uncolored lines. Like the thin-line polygonal model PGb and other polygonal models, the front-half polygonal model PGc represents a shape of the host vehicle 9 in 3-D, using the plural polygons. Herein, the front-half polygonal model PGc is the same as the thin-line polygonal model PGb in terms of the portions representing the front-half body frame of the host vehicle 9 and the main parts configuring the outer shape of the host vehicle 9 (i.e. tires, front lights, back lights, side mirrors, etc.), which are colored. However, the front-half polygonal model PGc is different from the thin-line polygonal model PGb in terms of portions representing the back half of the host vehicle 9, which is not colored. In other words, as for the front-half polygonal model PGc, polygons for portions other than the front-half body frame and the main parts configuring the outer shape of the host vehicle 9 are not colored.

Therefore, when the front-half polygonal model PGc is viewed from the arbitrary virtual viewpoint, the object image of the object existing behind the uncolored portions of the front-half polygonal model PGc is not hidden behind the host vehicle image in the frame style but is shown in the combined image. As mentioned above, the portion representing the front-half body frame of the host vehicle 9 in the front-half polygonal model PGc is shown by relatively thin lines and the frame lines for the back half of the host vehicle 9 are not shown because the back-half body frame is not colored. Therefore, the user may not understand the shape of the host vehicle 9 as easily as in the case of the thin-line polygonal model PGb.

However, in the case of the front-half polygonal model PGc, the user more easily understands the position of the object existing behind the host vehicle 9 viewed from the virtual viewpoint in the frame style, as compared with the thin-line polygonal model PGb. In other words, in the case of the thin-line polygonal model PGb, there are cases where since a portion of the object is hidden behind the frame lines configuring the host vehicle image, it is difficult for the user to sufficiently see the distance between the host vehicle image and the object image on the screen. In such a case, it is possible to display the object image of the object hidden behind the frame lines configuring the host vehicle image, by changing the style form of the polygonal model in the frame style from the thin-line polygonal model PGb to the front-half polygonal model PGc by a selection of the user. Thus, the user can recognize the host vehicle image and the object image separately, can see the distance between the host vehicle image and the object image on the screen and thus can correctly understand the actual distance between the host vehicle 9 and the object.

The change of the style form of the polygonal model in the frame style will be described later. The style form may be changed by a user operation with the operation part 4 before the combined image is displayed on the display 3 or after the combined image is displayed on the display 3.

With reference back to FIG. 3, generation of the combined image is explained. Each area in the projection target area of the projection surface TS corresponds to one of the four captured images SF, SB, SL and SR, based on corresponding information in, for example, table data. The vicinity image generator 22 projects the data of each of the four captured images SF, SB, SL and SR onto the corresponding area thereof.

Concretely, the vicinity image generator 22 projects the data of the captured image SF captured by the front camera 5F onto an area PF corresponding to the area in front of the host vehicle 9, in the projection target area. Moreover, the vicinity image generator 22 projects the data of the captured image SB captured by the rear camera 5B onto an area PB corresponding to the area behind the host vehicle 9, in the projection target area. Furthermore, the vicinity image generator 22 projects the captured image SL captured by the left side camera 5L onto an area PL corresponding to the area on the left side of the host vehicle 9, in the projection target area, and the captured image SR captured by the right side camera 5R onto an area PR corresponding to the area on the right side of the host vehicle 9, in the projection target area.

When the data of the captured images is projected onto the areas in the projection target area on the projection surface TS, as mentioned above, the vicinity image generator 22 places the 3-D polygonal model (e.g. the thick-line polygonal model PGa) showing the host vehicle 9 to the vehicle area R0.

Next, the vicinity image generator 22 sets a virtual viewpoint VP for the projection surface TS in the virtual 3-D space and generates the vicinity image. For example, the virtual viewpoint VP is set at a point higher than a vehicle height in front of the host vehicle 9, having a view direction looking backward.

Moreover, the vicinity image generator 22 clips data projected onto an area included in a predetermined field of view of the virtual viewpoint VP and then generates the vicinity image. Furthermore, the vicinity image generator 22 generates the host vehicle image based on the virtual viewpoint VP. Then the combined image generator 23 generates a combined image IMa by superimposing the host vehicle image on the generated vicinity image.

Here, since the thick-line polygonal model PGa is selected as the host vehicle image, the combined image IMa includes the thick frame image 91a, which is the host vehicle image in the frame style that shows the body frame of the host vehicle 9 by relatively thick lines. Moreover, since another vehicle (hereinafter referred to as "rear vehicle") exists behind the host vehicle 9, the combined image IMa also includes an image 92a of the rear vehicle (hereinafter referred to as "rear vehicle image 92a") that is an object existing behind the host vehicle image shown as the thick frame image 91a viewed from the virtual viewpoint VP. Thus, the user can see the rear vehicle image 92a existing behind the thick frame image 91a that is the host vehicle image, and can understand the actual distance between the host vehicle 9 and the rear vehicle by seeing the distance between the thick frame image 91a and the rear vehicle image 92a on the screen.

In a case where it is difficult for the user to see the distance between the thick frame image 91a and the rear vehicle image 92a on the screen because a portion of the rear vehicle image 92a is hidden behind the frame lines of the thick frame image 91a, the user can change the style form of the polygonal model in the frame style of the host vehicle image.

Figure 5:
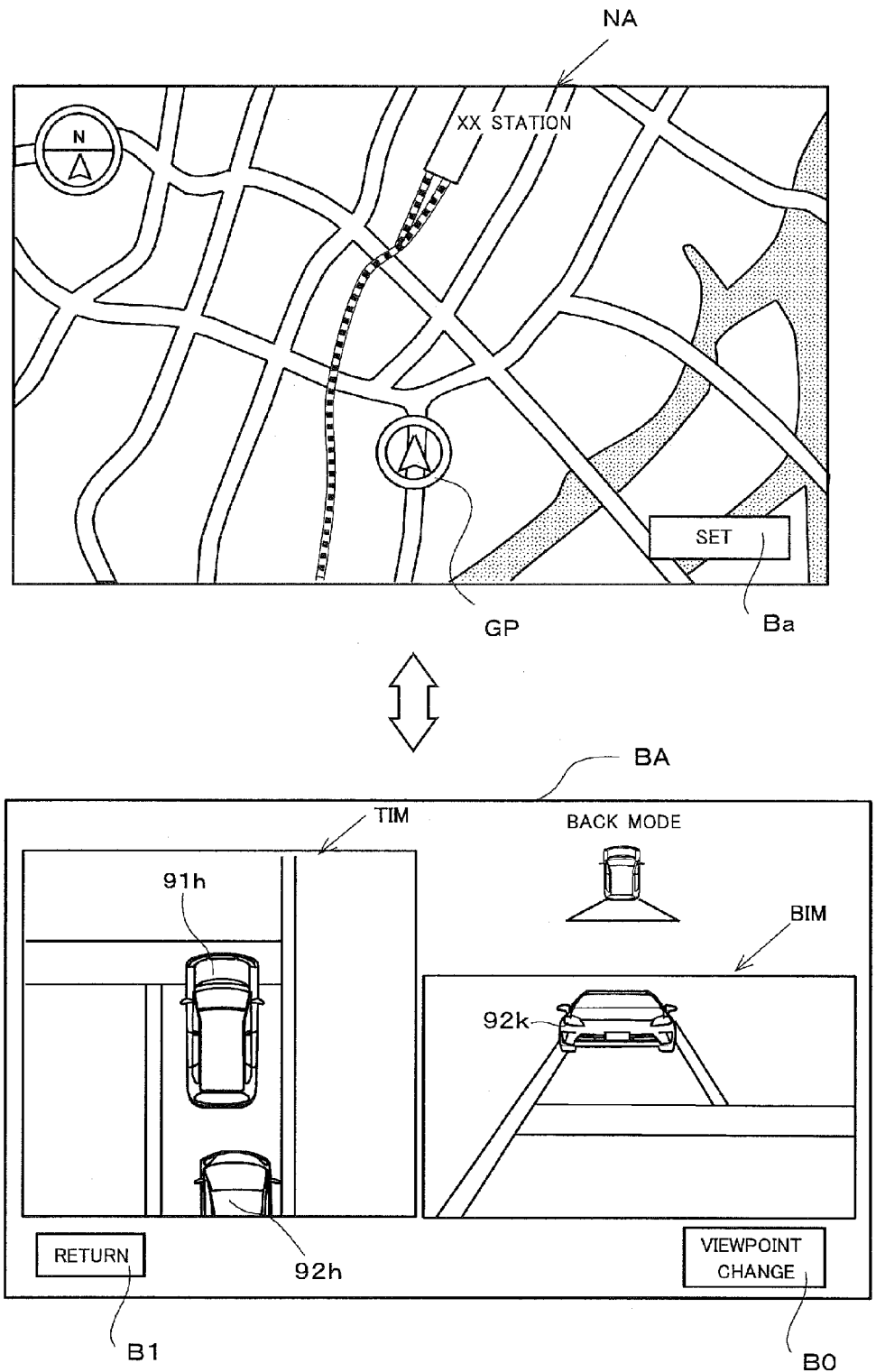
FIG. 5 illustrates a transition of an image displayed on a display.

1-3. Change of the Style Form of the Polygonal Model Representing the Host Vehicle Image in the Frame Style Next, explained is the change of the style form of the polygonal model representing the host vehicle image in the frame style in the combined image, with reference to FIG. 5 to FIG. 8. FIG. 5 illustrates a transition of the display image displayed on the display 3. An upper drawing in FIG. 5 shows a navigation image NA that is displayed on the display 3 when a navigation function is performed. Moreover, a lower drawing in FIG. 5 shows a back mode image BA that is displayed on the display 3 to mainly show the area behind the host vehicle 9 when the host vehicle 9 moves backwards.

When the navigation function is performed, stored map data and the like are retrieved from a memory, not illustrated in FIG. 3, in the display 3, and the navigation image NA shown in the upper drawing in FIG. 5 is displayed on the display 3. The navigation image NA includes a current position mark GP showing a current position of the host vehicle 9, a setting button Ba, etc. superimposed on a map image. A function of the setting button Ba is performed by a user operation, for example, by touching the touch panel 31 that is a part of the operation part 4, with a finger of the user. Different functions including the navigation function are set by the user operation with the setting button Ba. The different functions include setting of the frame style for the host vehicle image in the combined image to be displayed on the display 3. The setting of the frame style for the host vehicle image will be described later.

When a signal representing a shift position "R (backwards)" is sent from the shift sensor 101 while the display 3 is displaying the navigation image NA, the back mode image BA is displayed on the display 3. In other words, when the shift position is in "R (backwards)," the host vehicle 9 is in a state of moving backwards. Therefore, the back mode image BA that shows mainly the area behind the host vehicle 9 is displayed on the display 3.

The back mode image BA includes a combined image TIM that is an overhead view image viewed from a virtual viewpoint (e.g. "virtual viewpoint VP1" later described with reference to FIG. 10) located straight above the host vehicle 9 and looking straight down (a vertical direction) towards the host vehicle 9 in the projection surface TS shown in FIG. 3. Moreover, in addition to the combined image TIM, the back mode image BA also includes a captured image BIM captured by the rear camera 5B of the host vehicle 9.

Figure 6:
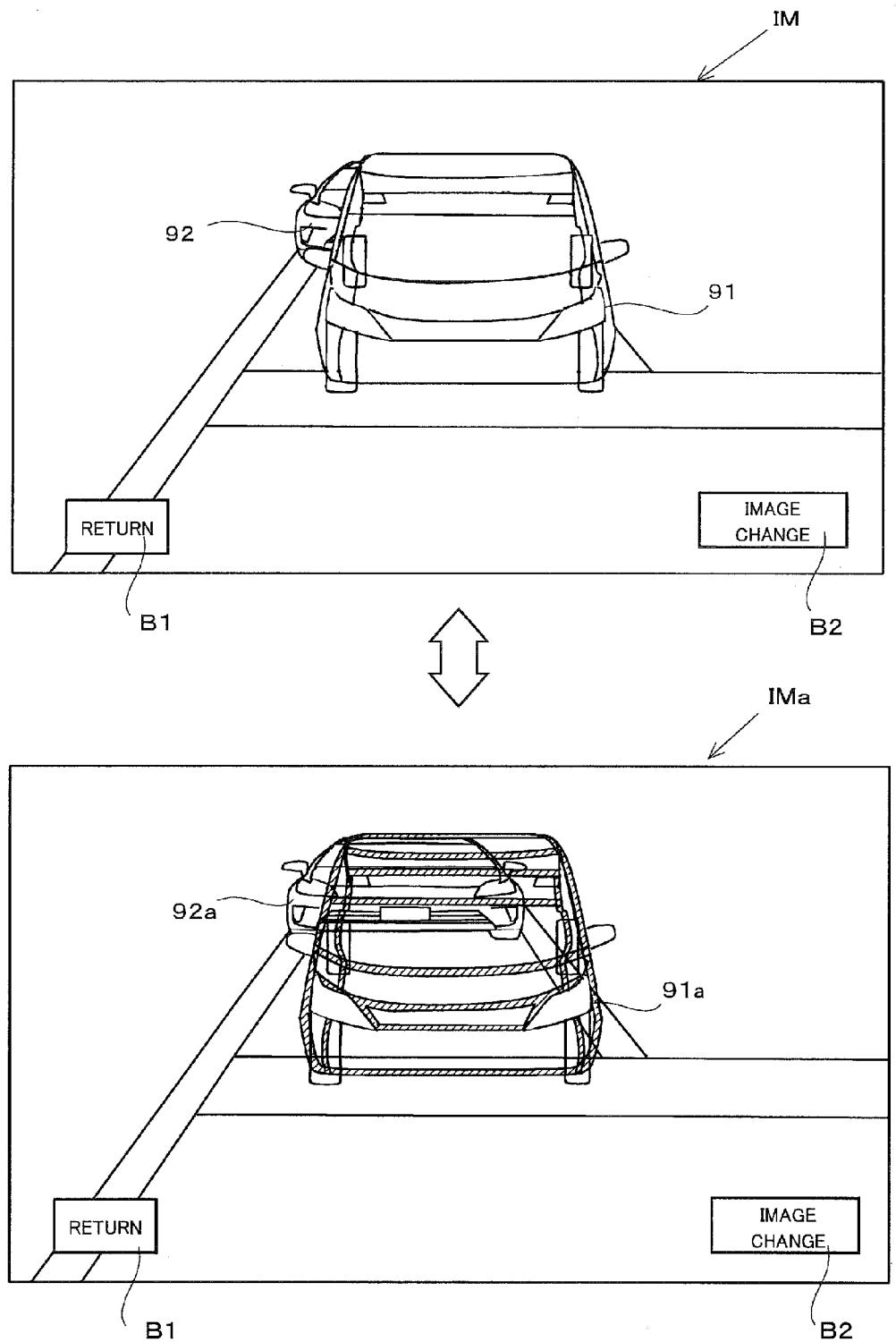
FIG. 6 illustrates a combined image generated by superimposing a host vehicle image on a vicinity image viewed from a virtual viewpoint.

A real host vehicle image 91h corresponding to the real image polygonal model PG is shown in the combined image TIM. Moreover, a rear vehicle image 92h corresponding to the rear vehicle existing behind the host vehicle 9 is shown in the combined image TIM. In the captured image BIM, a rear vehicle image 92k captured by the rear camera 5B, corresponding to the rear vehicle image 92h in the combined image TIM, is shown. Moreover, a viewpoint change button B0 and a return button B1 are shown in the back mode image BA including the combined image TIM and the captured image BIM. By a user operation with the viewpoint change button B0, the virtual viewpoint is changed from the virtual viewpoint VP1 to the virtual viewpoint VP explained with reference to FIG. 3, and then a combined image IM, explained next with reference to FIG. 6, is displayed on the display 3. However, by a user operation with the return button B1, the navigation image NA is displayed on the display 3.

Figure 7:
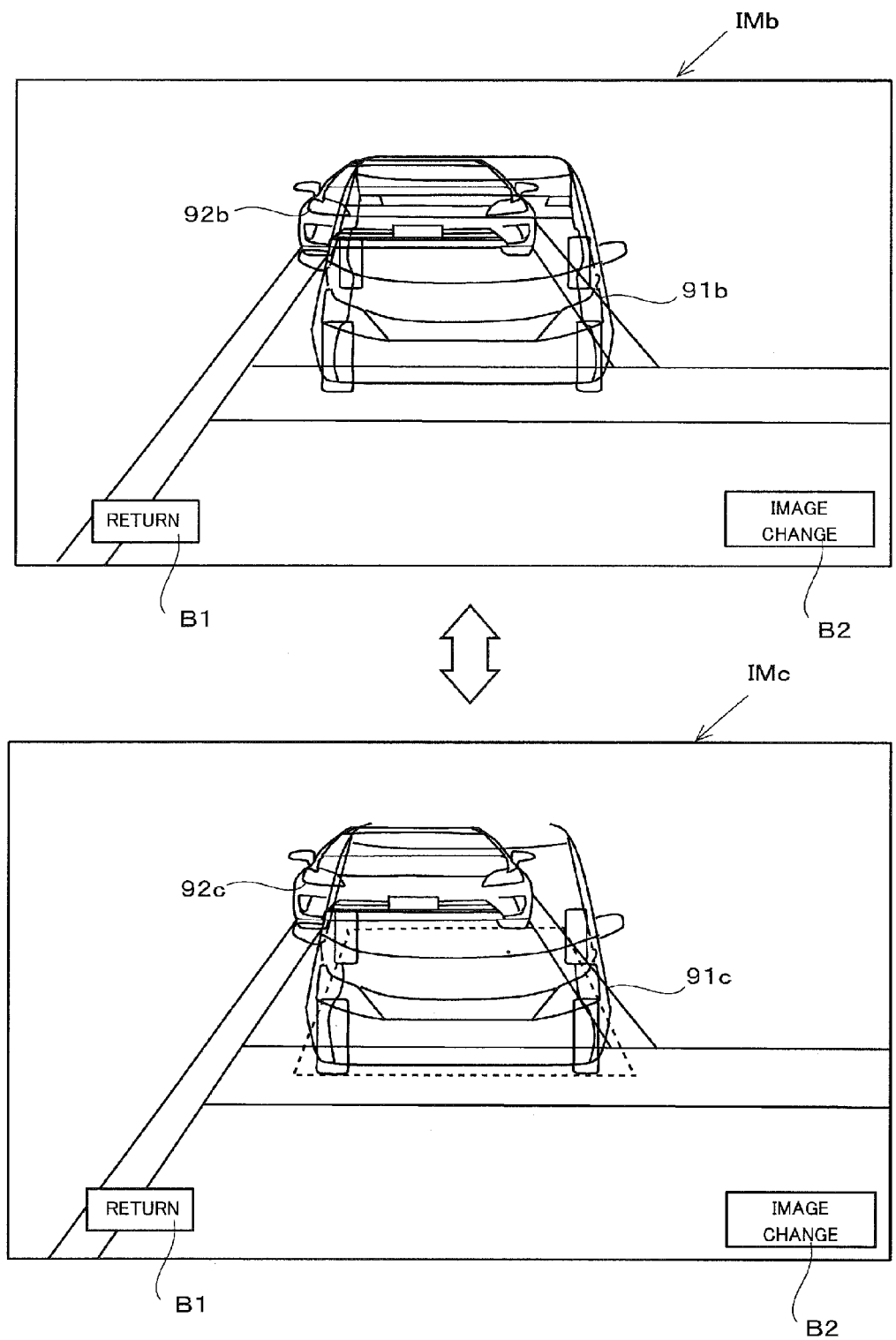
FIG. 7 illustrates a combined image generated by superimposing a host vehicle image on a vicinity image viewed from a virtual viewpoint.

FIG. 6 illustrates the combined image generated by superimposing the host vehicle image on the vicinity image viewed from the virtual viewpoint VP. Here explained are the combined images shown in FIG. 6 and FIG. 7. Each of FIG. 6 and FIG. 7 illustrates the combined image generated by superimposing, on the vicinity image viewed from the virtual viewpoint VP, one of the plural polygonal models (the real image polygonal model PG, the thick-line polygonal model PGa, the thin-line polygonal model PGb and the front-half polygonal model PGc) in the frame style and the style forms thereof are different from each other.

An upper drawing in FIG. 6 shows the combined image IM generated by superimposing, on the vicinity image viewed from the virtual viewpoint VP, a host vehicle image 91 of the real image polygonal model PG (hereinafter referred to as "real host vehicle image 91") viewed from the same virtual viewpoint VP. In addition to the real image host vehicle image 91, a rear vehicle image 92 corresponding to a rear vehicle existing behind the host vehicle 9 is shown in the combined image IM. Here, a portion of the rear vehicle image 92 is shown in the combined image IM. However, other portions of the rear vehicle image 92 are hidden behind the real host vehicle image 91 and are not shown. Therefore, the user cannot see a whole image of the rear vehicle. In other words, when the real image polygonal model PG is viewed from the virtual viewpoint VP, most portions of an image of an object existing behind the real image polygonal model PG viewed from the virtual viewpoint VP is hidden behind the real host vehicle image 91 and is not shown in the combined image. Therefore, when looking at the combined image IM, the user can see presence of the rear vehicle image 92 existing behind the real host vehicle image 91, but cannot see the distance between the real host vehicle image 91 and the rear vehicle image 92 sufficiently in the combined image. In other words, the user cannot correctly understand the actual distance between the host vehicle 9 and the rear vehicle.

In such a case, when a user operation is performed with an image change button B2, the display 3 shows the combined image IMa, shown in a lower drawing in FIG. 6, including the host vehicle image 91a of which the style form is changed to the frame style from the real image style. However, when a user operation is performed with the return button B1, the display 3 displays the back mode image BA that has been displayed on the display 3 immediately before the user operation with the image change button B2. The return button B1 shown in the drawings functions to change an image currently being displayed on the display 3 to an image having been displayed on the display 3 immediately before the user operation with the image change button B2.

The lower drawing in FIG. 6 shows the combined image IMa generated by superimposing the thick frame image 91a shown in the frame style by relatively thick lines corresponding to the thick-line polygonal model PGa viewed from the virtual viewpoint VP, on the vicinity image viewed from the same virtual view point. In other words, in accordance with the user operation with the image change button B2, the real host vehicle image 91 in the combined image IM is changed to the thick frame image 91a and the combined image IMa is displayed on the display 3. In addition to the thick frame image 91a, the rear vehicle image 92a is shown in the combined image IMa. Concretely, in the combined image IMa, the rear vehicle image 92a existing behind the thick frame image 91a viewed from the virtual viewpoint VP is not hidden behind the host vehicle image but is shown in the combined image. Thus, the user can recognize the host vehicle image and the rear vehicle image separately, can surely see the distance between the host vehicle image and the rear vehicle image on the screen, and thus can correctly understand the actual distance of the rear vehicle that is an object relative to the host vehicle.

Here, when the host vehicle image is shown in the style form using the relatively-thick lines, as shown in the combined image IMa, the user easily recognizes the shape and the position of the host vehicle image on the screen. However, depending on a position of the object image in the combined image, a portion of the rear vehicle image 92a is hidden behind the frame lines of the thick frame image 91a. Therefore, there are cases where it is difficult for the user to see the distance between the thick frame image 91a and the rear vehicle image 92a on the screen. In such a case, the user performs the user operation with the image change button B2 to display a combined image IMb, shown as an upper drawing in FIG. 7, on the display 3.

FIG. 7 illustrates the combined image generated by superimposing the host vehicle image on the vicinity image viewed from the virtual viewpoint VP. The upper drawing in FIG. 7 shows the combined image IMb generated by superimposing a thin frame image 91b that is the host vehicle image in the frame style shown by relatively thin lines corresponding to the thin-line polygonal model PGb viewed from a virtual viewpoint VP, on the vicinity image viewed from the same virtual viewpoint VP. In addition to the thin frame image 91b, a rear vehicle image 92b corresponding to the rear vehicle existing behind the host vehicle 9 is shown in the combined image IMb. Concretely, in the case of the combined image IMb, when the thin-line polygonal model PGb is viewed from the virtual viewpoint VP, the rear vehicle image 92b existing behind the thin frame image 91b is not hidden behind the host vehicle image but shown in the combined image through uncolored portions of the thin frame image 91b. Thus, the user can recognize the host vehicle image and the rear vehicle image separately, can surely see the distance between the host vehicle image and the rear vehicle image on the screen, and thus can correctly understand the actual distance of the rear vehicle that is an object relative to the host vehicle.

Here, the frame lines of the thin frame image 91b are different from the frame lines of the thick frame image 91a described above. In other words, the frame lines of the thin frame image 91b are thinner than the frame lines of the thick frame image 91a. Therefore, as compared with the thick frame image 91a, the driver can see the distance between the thin frame image 91b and the rear vehicle image 92b more easily in the combined image although the driver less easily recognize the shape and the position of the host vehicle image in the combined image. Therefore, the user can recognize the host vehicle image and the rear vehicle image separately and can correctly understand the actual distance between the host vehicle and the rear vehicle that is an object.

Moreover, depending on a position of the object image in the combined image, a portion of the rear vehicle image 92b is hidden behind the frame lines of the thin frame image 91b. Therefore, there are occasions where it is difficult to see the distance between the thin frame image 91b and the rear vehicle image 92b on the screen. In such a case, the user performs the user operation with the image change button B2 to display a combined image IMc, shown as a lower drawing in FIG. 7, on the display 3

The lower drawing in FIG. 7 shows the combined image IMc generated by superimposing a host vehicle image 91c that is the front half of the host vehicle image in the frame style shown by relatively thin lines (hereinafter referred to as "front body frame image 91c") corresponding to the front-half polygonal model PGc viewed from the virtual view point VP, on the vicinity image viewed from the same virtual viewpoint VP. In other words, in accordance with the user operation with the image change button B2, the thin frame image 91b in the combined image IMb is changed to the front body frame image 91c and the combined image IMc is displayed on the display 3. Concretely, when the front-half polygonal model PGc is viewed from the virtual viewpoint VP, a rear vehicle image 92c existing behind the front body frame image 91c is not hidden behind the host vehicle image but shown in the combined image IMc through uncolored portions of the front-half polygonal model PGc. Thus, the user can recognize the host vehicle image and the rear vehicle image separately, can surely see the distance between the host vehicle image and the rear vehicle image on the screen, and thus can correctly understand the actual distance between the host vehicle and the rear vehicle that is an object.

As described above, by changing a style form of the body frame of the host vehicle image in the frame style in accordance with the predetermined condition, regardless of the position of the object, the user can recognize the host vehicle image and the object image separately, can surely see the distance between the host vehicle image and the object image on the screen and thus can correctly understand the actual distance of the object relative to the host vehicle 9. Moreover, one style form is selected in accordance with a user operation performed by the user of the host vehicle 9 with the operation part 4, from amongst a plurality of the style forms which differ from each other in thickness of the frame lines, and the host vehicle is shown in the selected style form. As a result, even when it is difficult for the user to see the distance between the host vehicle image and the object image on the screen because the object image is hidden behind the host vehicle image, the user can recognize the host vehicle image and the object image, separately, and then can correctly understand the actual distance between the host vehicle 9 and the object.

When an operation is performed with the image change button B2 in the combined image IMc shown in the lower drawing in FIG. 7, the combined image IM shown in the upper drawing in FIG. 6 is displayed on the display, instead of the combined image IMc. As described above, the user can freely select one from amongst the plurality of style forms in the frame style to see the distance between the host vehicle image and the object image more easily.

Figure 8:
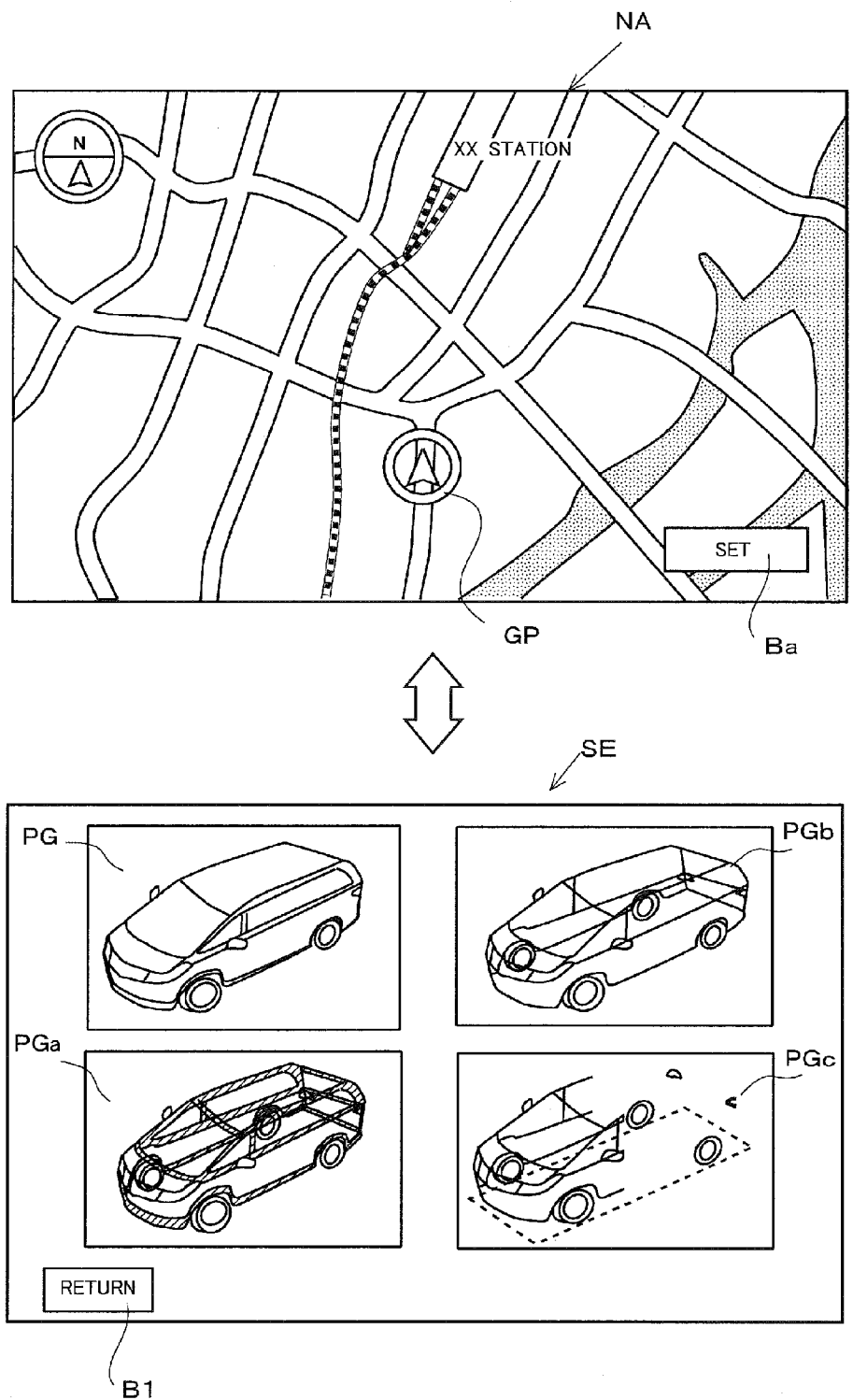
FIG. 8 illustrates setting relating to a host vehicle image in a frame style to be shown in the combined image.

FIG. 8 illustrates setting relating to the host vehicle image in a frame style to be shown in the combined image. An upper drawing in FIG. 8 shows the navigation image NA. In accordance with a user operation with the setting button Ba on the navigation image NA, a vehicle image selection screen SE shown in a lower drawing in FIG. 8 is displayed on the display 3.

The vehicle image selection screen SE is used to select one polygonal model by a user operation beforehand for generation of the combined image. The vehicle image selection screen SE includes the real image polygonal model PG, the thick-line polygonal model PGa, the thin-line polygonal model PGb and the front-half polygonal model PGc. One polygonal model selected by the user operation from amongst the plural polygonal models is placed to the vehicle area R0 of the projection surface TS during the generation of the combined image. Then the vicinity image generator 22 generates the host vehicle image viewed from a virtual viewpoint, and then generates the combined image by superimposing the host vehicle image on the vicinity image.

1-4. Procedure

Figure 9:
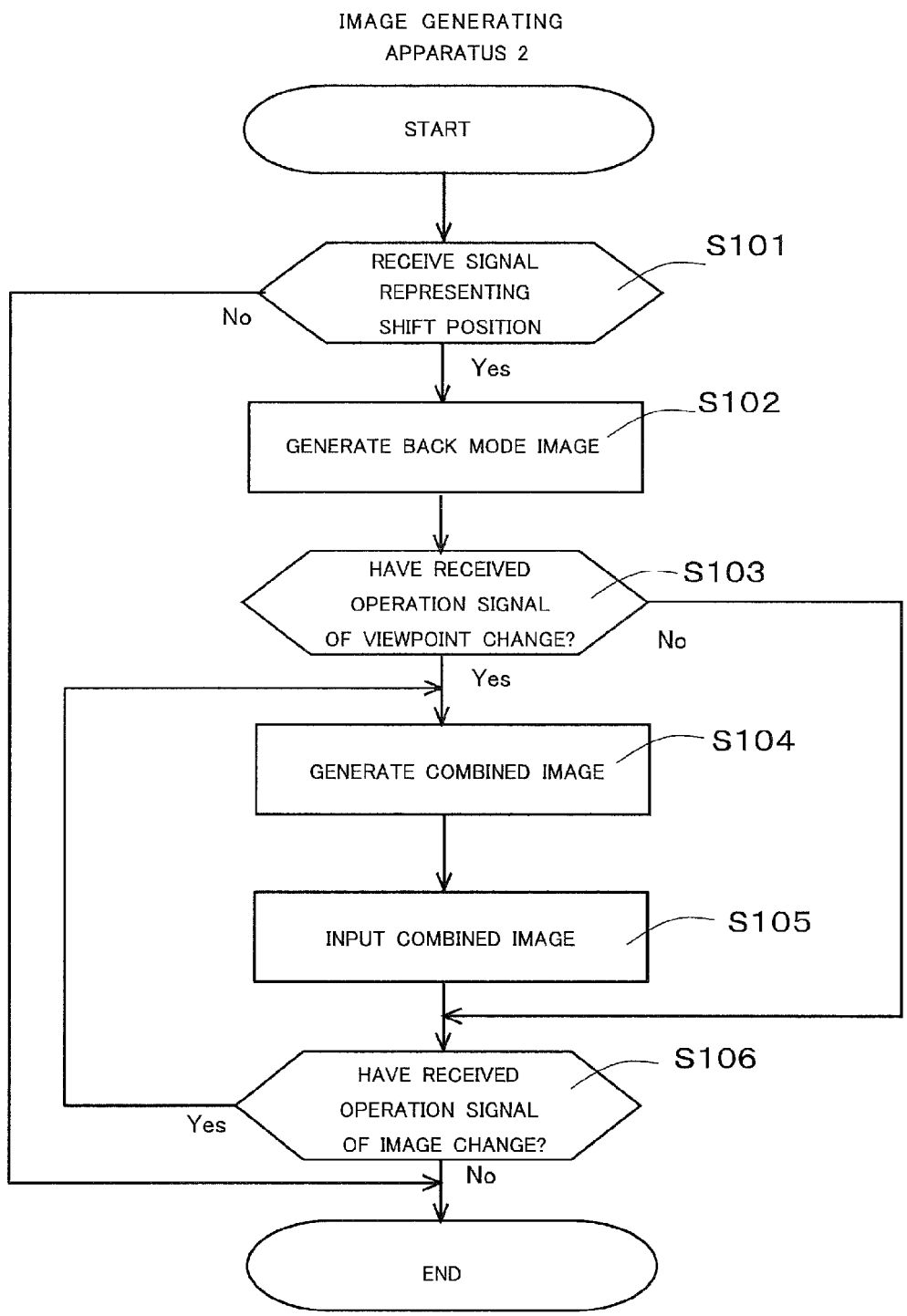
FIG. 9 is a flowchart explaining a procedure performed by the image generating apparatus.

FIG. 9 is a flowchart explaining a procedure performed by the image generating apparatus 2. When the signal receiver 26 of the image generating apparatus 2 receives the signal representing the shift position "R (backwards)" from the shift sensor 101 (Yes in a step S101), the vicinity image generator 22 and the combined image generator 23 generate the back mode image BA including the combined image TIM viewed from the virtual viewpoint VP1 located straight above the host vehicle 9 and the captured image BIM captured by the rear camera 5B, and the generated back mode image BA is displayed on the display 3 (a step S102). However, if the signal receiver 26 does not receive the signal representing the shift position "R (backwards)" from the shift sensor 101 (No in the step S101), the procedure ends.

Next, when the operation receiver 25 receives an operation signal representing a user operation with the viewpoint change button B0 that is a part of the operation part 4, in the back mode image BA (Yes in a step S103), the vicinity image generator 22 generates the vicinity image of the host vehicle 9 viewed from the virtual viewpoint VP and the host vehicle image (e.g. a thick frame image 91a) corresponding to one polygonal model (e.g. the thick-line polygonal model PGa) selected beforehand with the vehicle image selection screen SE, and the combined image generator 23 generates the combined image (e.g. the combined image IMa) by superimposing the host vehicle image on the vicinity image (a step S104). However, if the operation receiver 25 does not receive the operation signal representing the user operation with the viewpoint change button B0 (No in the step S103), the procedure moves to a step S106 described later.

Then the image outputting part 24 inputs the combined image generated by the combined image generator 23 to the display 3, and the display 3 displays the generated combined image (a step S105).

Next, when the operation receiver 25 receives an operation signal representing a user operation with the image change button B2 that is a part of the operation part 4 (Yes in the step S106), the vicinity image generator 22 generates the vicinity image of the host vehicle 9 viewed from the virtual viewpoint VP and the host vehicle image (e.g. the thin frame image 91b) corresponding to another polygonal model (e.g. the thin-line polygonal model PGb) of which the style form is different from the style form of the polygonal mode (e.g. the thick-line polygonal model PGa) selected beforehand with the vehicle image selection screen SE. Then, the combined image generator 23 generates the combined image (e.g. the combined image IMb) by superimposing the host vehicle image on the vicinity image (the step S104). However, if the operation receiver 25 does not receive the operation signal representing the user operation with the image change button B2 (No in the step S106), the procedure ends.

When the operation receiver 25 does not receive the operation signal representing the user operation with the image change button B2 that is a part of the operation part 4, in the step S106, the combined image displayed on the display 3 is not changed and maintained. Moreover, in such a case, when a predetermined time (e.g. five minutes) passes, the combined image may be changed to the navigation image NA.

By changing the style form of the host vehicle image in the frame style, the user can recognize the host vehicle image and the rear vehicle image separately, can see the distance between the host vehicle image and the rear vehicle image, regardless of the position of the rear vehicle, and thus can correctly understand the actual distance of the rear vehicle to the host vehicle.

Moreover, even when it is difficult for the user to see the distance between the host vehicle image and the rear vehicle image that is the object image, on the screen because a portion of the object image is hidden behind the host vehicle image in the frame style, the user can recognize the host vehicle image and the object image separately and can correctly understand the actual distance of the object to the host vehicle 9, by selecting the style form having thickness easy to see the distance.

1-5. Change of a Style Form of the Host Vehicle Image in the Frame Style in Accordance with a Virtual Viewpoint In this embodiment, it is possible to change the style form of the host vehicle image shown in the frame style in the combined image in accordance with a virtual viewpoint, such as the virtual viewpoint VP1 of the combined image TIM in FIG. 5 and the virtual viewpoint VP of the combined image IMb in FIG. 7. In other words, the style form of the host vehicle image can be changed to the real image style or to the frame style, in accordance with the virtual viewpoint. Such a change of the host vehicle image is explained with reference to FIG. 10.

Figure 10:
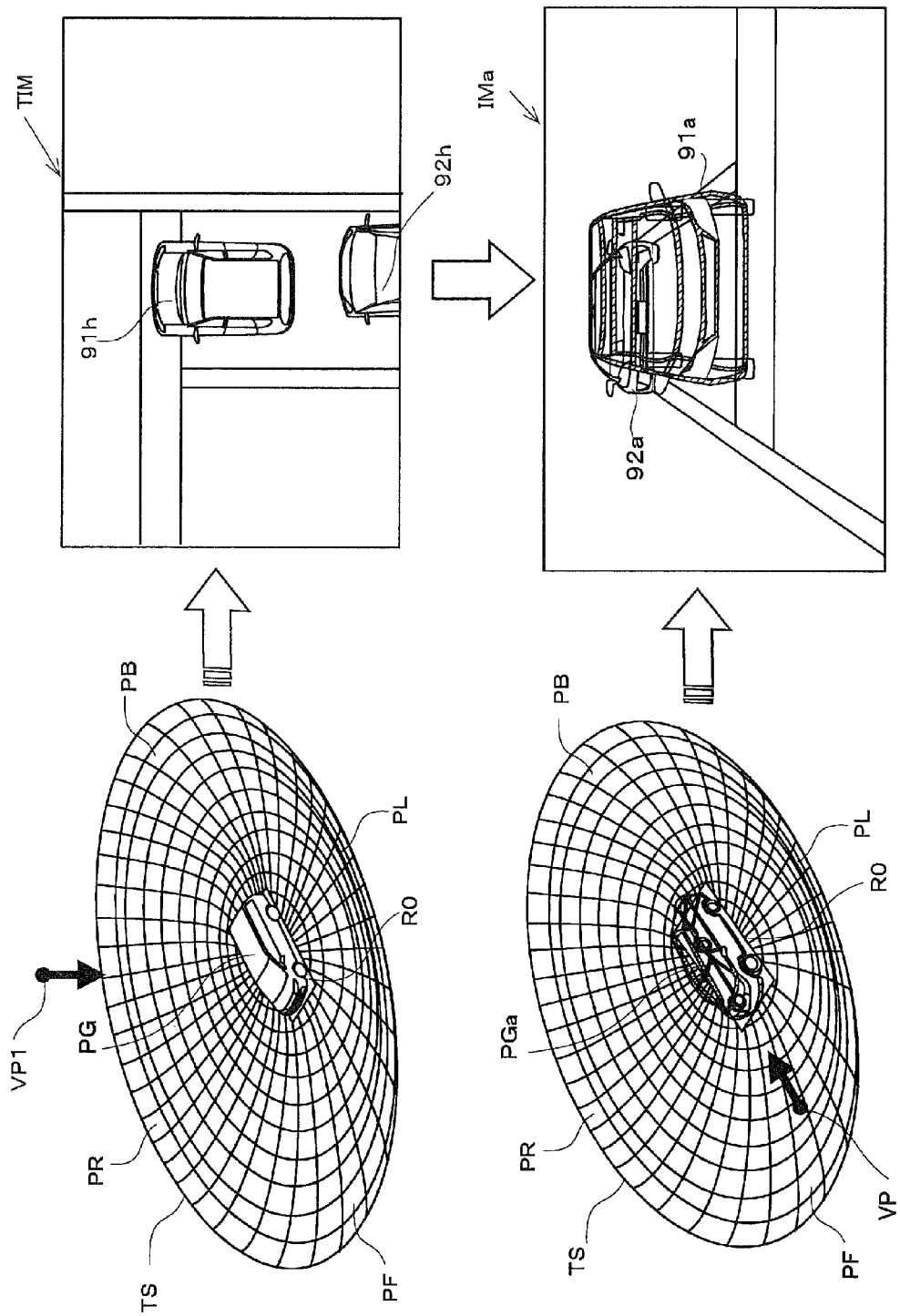
FIG. 10 illustrates a change of a style form of a frame style for the host vehicle image changed in accordance with a virtual viewpoint.

FIG. 10 illustrates a change of the style form of the host vehicle image shown in the frame style, in accordance with a virtual viewpoint. An upper drawing in FIG. 10 shows the combined image TIM viewed from the virtual viewpoint VP1 located straight above the real image polygonal model PG and looking straight down. The combined image TIM is generated when the back mode image BA is generated and in such a case described below. For example, the image generating apparatus 2 generates the combined image TIM when the signal receiver 26 receives a signal representing IGON (ignition is ON) of the host vehicle 9 of the user. Thus, the display 3 displays the combined image TIM. As described above, when the virtual viewpoint VP1 is the virtual viewpoint of the combined image to be generated, the real image polygonal model PG is selected as the polygonal model of the host vehicle because even if the real host vehicle image 91h is superimposed on the vicinity image viewed from the virtual viewpoint VP1, there is no blind area that the user cannot see the rear vehicle image hidden behind the real host vehicle image 91h. Moreover, if the host vehicle image is displayed in the frame style, it may be difficult for the user to understand the host vehicle image because the shape of the host vehicle image is not clear.

As described above, the host vehicle image is displayed in the real image style in which the shape and the position of the host vehicle are more easily understood by the user, as compared with the frame style. Therefore, the user can recognize the host vehicle image and the rear vehicle image separately and thus can correctly understand the actual distance of the rear vehicle to the host vehicle 9. Then, in a case where an area behind the host vehicle 9 viewed from the virtual viewpoint is not a blind area of the user, the image generating apparatus 2 displays on the display 3 the combined image TIM generated by superimposing on the vicinity image the host vehicle image in the real image style corresponding to the real image polygonal model PG.

On the other hand, a lower drawing in FIG. 10 is the combined image IMa viewed from the virtual viewpoint VP located higher than the vehicle height in front of the host vehicle 9, having the view direction looking backward. As described above, when the virtual viewpoint VP is the virtual viewpoint of the combined image to be generated, one model corresponding to the host vehicle image in the frame style (e.g. the thick-line polygonal model PGa) is selected as the polygonal model of the host vehicle because there is a blind area that is a portion of an area behind the host vehicle 9 viewed from the virtual viewpoint VP that the user cannot see. In the case where there is the blind area behind the host vehicle 9 viewed from the virtual viewpoint that the user cannot see, the image generating apparatus 2 displays on the display 3 the combined image IMa generated by superimposing on the vicinity image the host vehicle image in the frame style, such as the thick-line polygonal model PGa.

As described above, the host vehicle image is superimposed on the vicinity image, in one of the frame style and the real image style, in accordance with the virtual viewpoint. Therefore, the host vehicle image of which the shape the user easily understands is displayed in the combined image, regardless of a position of the virtual viewpoint. Thus, the user can correctly understand the actual distance between the host vehicle and the object.

2. Second Embodiment

Next, a second embodiment is explained. An image generating apparatus 2 of an image display system 10 in the second embodiment changes the configuration of the polygonal model explained in the first embodiment. Concretely, as for each model (the thick-line polygonal model PGa, the thin-line polygonal model PGb and the front-half polygonal model PGc) constructed with plural polygons, at least a portion of a host vehicle image shown in a frame style are constructed with pasted polygons. Each of the pasted polygons is generated by pasting a back surface of a polygon with a back surface of another polygon. A front surface of the pasted polygon is colored in a color different from a color in which a back surface is colored. A configuration and procedure of the image display system 10 in the second embodiment are the substantially same as the configuration and the procedure of the image display system 10 in the first embodiment. However, the second embodiment is different from the first embodiment in terms of the configuration of at least the portion of the plural polygons configuring each model, and thus a style form of the host vehicle image in the frame style generated by a vicinity image generator 22 is different. Therefore, a difference between the first and second embodiments is mainly explained with reference to FIG. 11 and FIG. 12.

Figure 11:
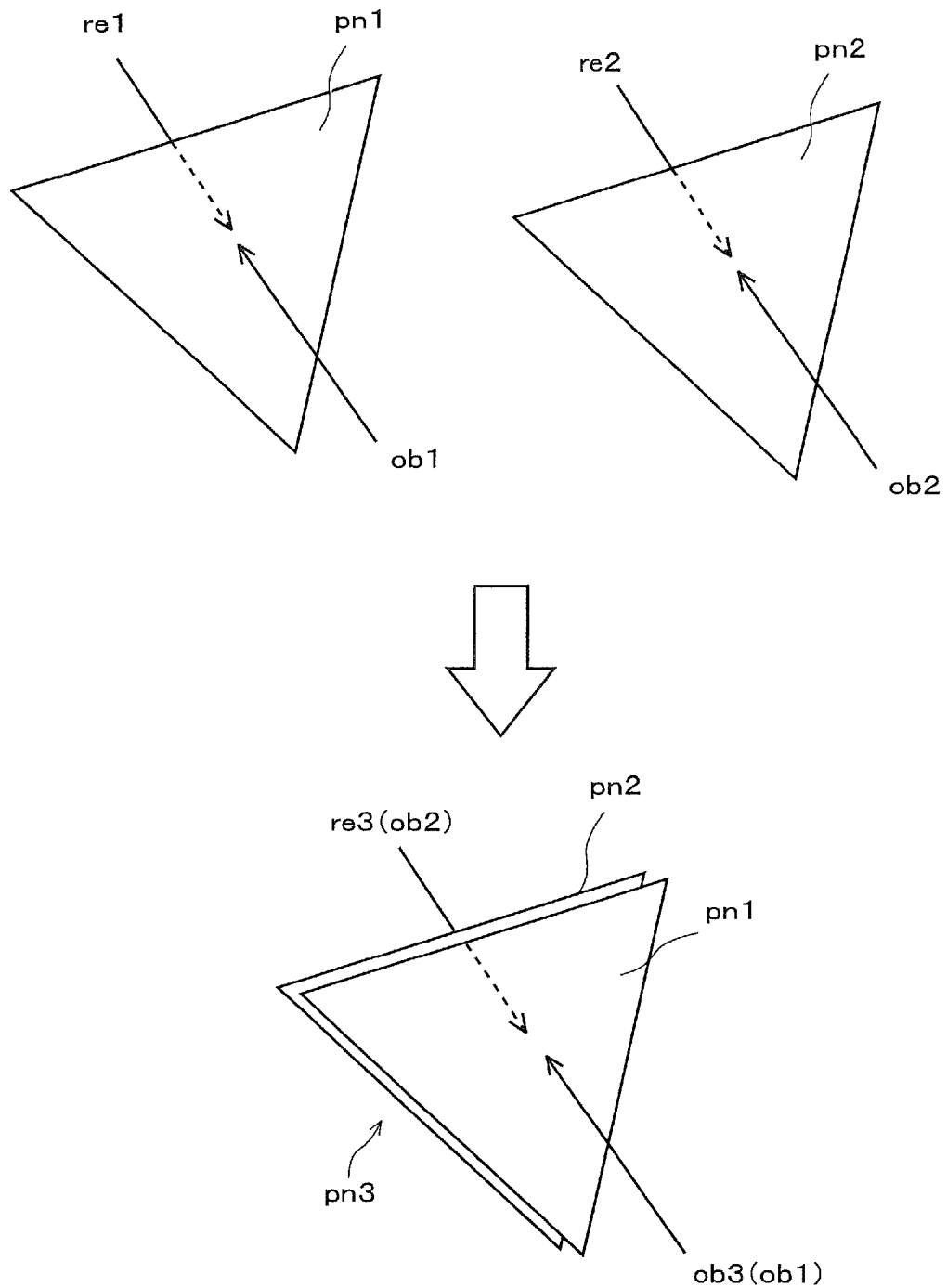
FIG. 11 illustrates a pasted polygon obtained by pasting two triangle polygons together.

FIG. 11 illustrates one pasted polygon generated by pasting two triangle polygons together. A polygon pn1 and a polygon pn2 shown in an upper drawing in FIG. 11 are in a same shape and have a same property. The polygon pn1 and the polygon pn2 have a front surface ob1 and a front surface ob2, and a back surface re1 and a back surface re2, respectively. Each polygonal model explained in the first embodiment is configured in 3-D by the plural polygons such as pn1 and pn2.

Moreover, in the first embodiment, the front surfaces ob1 (ob2) of the plural polygons pn1 (pn2) are colored in a different range, in a different color, etc., depending on a type of each polygonal model. For example, in a case of the real image polygonal model PG, the plural polygons pn1 (pn2) configuring a 3-D polygonal model of the host vehicle 9 is colored on the front surfaces ob1 (ob2) in a color similar to an actual color of the host vehicle 9. The back surfaces re1 (re2) of the polygons pn1 (pn2) are not colored. Therefore, when the front surfaces ob1 (ob2) of the polygons pn1 (pn2) are viewed from a virtual viewpoint, the color of the front surfaces ob1 (ob2) is displayed on the screen. When the back surfaces re1 (re2) of the polygons pn1 (pn2) are viewed from the virtual viewpoint, since the back surfaces re1 (re2) are not colored but transparent, the color for the front surfaces ob1 (ob2) is displayed on the screen.

In each polygonal model in the frame style in the first embodiment, amongst the plural polygons pn1 (pn2) configuring the host vehicle 9 in 3-D, the polygons pn1 (pn2) for the body frame and main parts configuring an outer shape of the host vehicle 9 (i.e. tires, front lights, back lights, side mirrors, etc.) are colored. However, the polygons pn1 (pn2) for portions other than for the body frame and the main parts are not colored. For example, the front surfaces ob1 (ob2) of the polygons pn1 (pn2) are colored in green, the body frame is shown in green in the frame style (e.g. frame lines of the thin frame image 91b shown in the upper drawing in FIG. 7).

On the other hand, in each polygonal model in the frame style in the second embodiment, a pasted polygon pn3 is generated by pasting back surfaces of two polygons together, for example, the back surface re1 of the polygon pn1 and the back surface re2 of the polygon pn2, for the body frame of the host vehicle 9. Moreover, for example, when the back surface re1 of the polygon pn1 is pasted with the back surface re2 of the polygon pn2 together, as shown in a lower drawing in FIG. 11, a front surface ob3 of the polygon pn3 is colored in a color different from a color for a back surface re3 of the polygon pn3. For example, the front surface ob3 of the polygon pn3 is colored in green and the back surface re3 of the polygon pn3 is colored in red. Next described is an example of a combined image generated by superimposing on a vicinity image the host vehicle image constructed with the pasted polygons.

Figure 12:
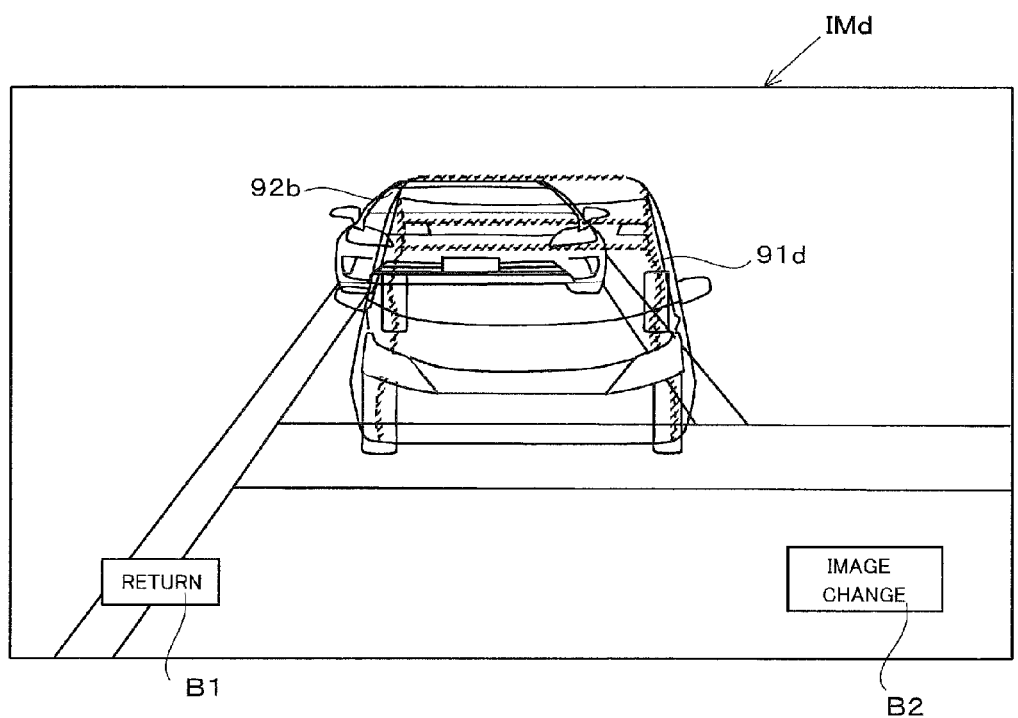
FIG. 12 illustrates a combined image including a polygonal model a portion of which shown in a frame style is constructed with pasted polygons.

FIG. 12 illustrates a combined image IMd including a thin-line polygonal model PGb of which the portion to be shown in the frame style is constructed with the pasted polygons pn3. For example, in a host vehicle image 91d in FIG. 12, a portion of the body frame shown in solid lines corresponding to the front surfaces ob3 is displayed in green, and a portion of the body frame shown in shaded dashed lines corresponding to the back surfaces re3 is displayed in red. In other words, when the host vehicle 9 is viewed from a virtual viewpoint VP, the front surfaces ob3 are used for a portion of the body frame seeable from the virtual viewpoint VP. As a result, the portion of the body frame is displayed in green.

Moreover, the back surfaces re3 are used for a portion of the body frame hidden in the host vehicle 9 and practically unseeable. As a result, the portion of the body frame is shown in red. In other words, a color for the frame lines corresponding to one side of the body frame of the host vehicle 9 is different from a color for an opposite side of the body frame. When the host vehicle 9 is viewed from the virtual viewpoint, the style form of the frame lines in the frame style displayed on a screen is changed, depending on a viewable side of the body frame. As a result, the user can immediately distinguish individual portions of the host vehicle 9 that individual frame lines represent. Therefore, the user can recognize the host vehicle image 91d in 3-D and can correctly understand an actual distance between the host vehicle 9 and an object.

Moreover, in the combined image IMd, the style form of the host vehicle image can be changed, like combined images described in the first embodiment, by a user operation with the image change button B2 shown in FIG. 12.

3. Third Embodiment

Next, a third embodiment is explained. An image display system 10a of an image generating apparatus 2a in the third embodiment detects an object that is an obstacle existing in a vicinity of a host vehicle 9, from image information and/or information from different sensors, and changes thickness of frame lines of a host vehicle image shown in a frame style, in accordance with a position of the object. In other words, in accordance with the position of the object, the image generating apparatus 2a determines one style form in the frame style selected from amongst the plurality of style forms which differ from each other in thickness of the frame lines. In other words, the predetermined condition is a position of the object such that the generator 2a generates the vehicle image in one style form selected in accordance with the position of the object, from amongst the plurality of style forms. The object does not necessarily have to be located at an exact distance relative to the host vehicle 9. The image generating apparatus 2a may change the style form when the object is located within a predetermined range relative to the host vehicle 9.

A configuration and procedure of the image display system 10a in the third embodiment are the substantially same as the configuration and the procedure of the image display system 10 in the first embodiment. However, the image display system 10a changes the style form of the host vehicle 9 shown in the frame style, in accordance with the position of the object existing in a vicinity of the host vehicle 9. Therefore, at least a portion of the configuration is different from the configuration in the first embodiment. Thus, the difference is mainly explained with reference to FIG. 13 and FIG. 14.

Figure 13:
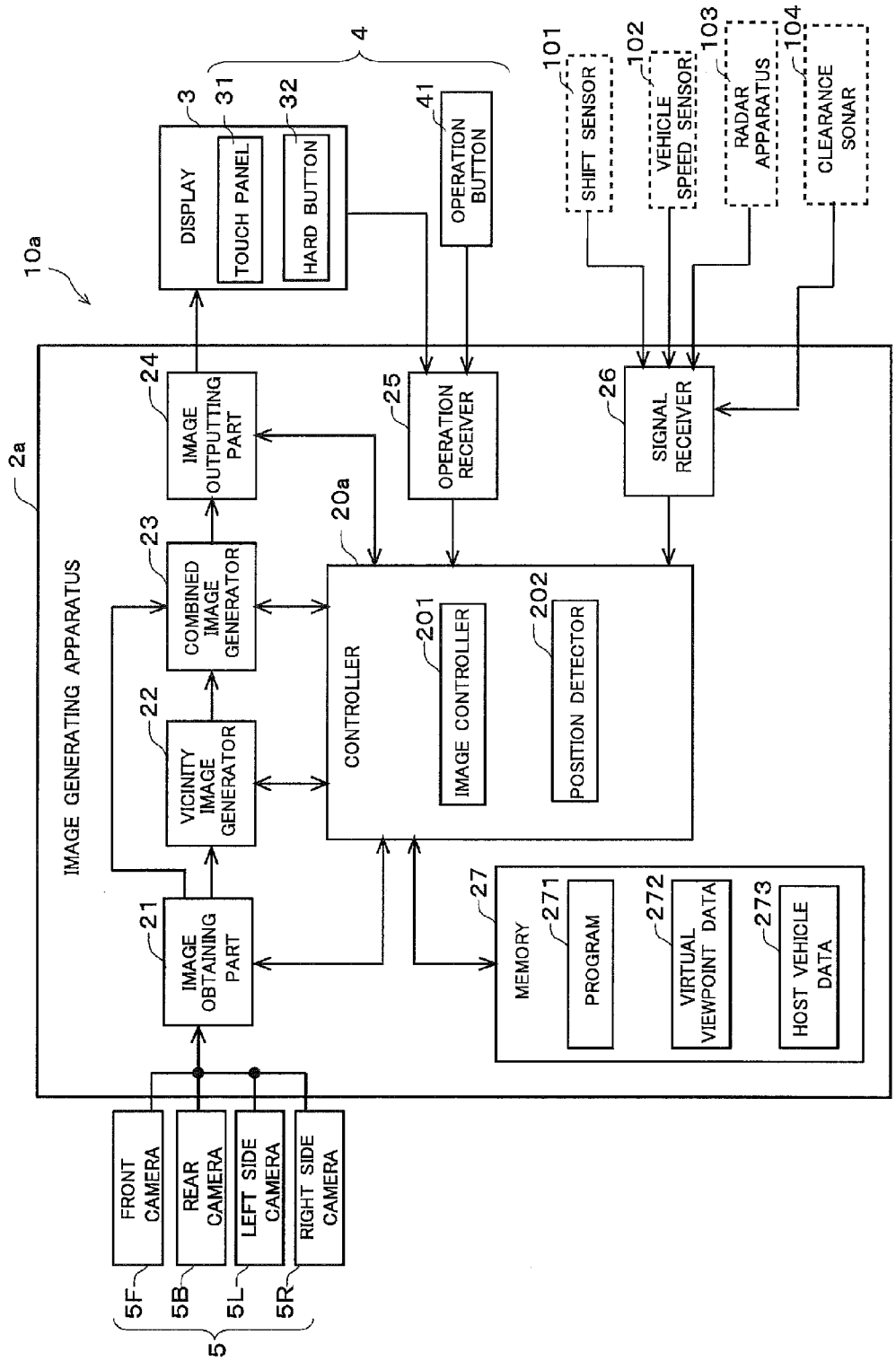
FIG. 13 is a diagram illustrating a configuration of an image display system.

FIG. 13 is a diagram illustrating the configuration of the image display system 10a. The image generating apparatus 2a of the image display system 10a includes, in a controller 20, a position detector 202 that detects the position of the object existing in the vicinity of the host vehicle 9. The position detector 202 detects an actual position of the object (e.g. an object image 92e in a combined image IMe shown in an upper drawing in FIG. 14) from an object image on a screen generated by the image generating apparatus 2a.

The position detector 202 may obtain information representing the position of the object (hereinafter referred to as "vicinity object information") existing in the vicinity of the host vehicle 9, based on information other than the object image on a screen. For example, the position detector 202 obtains the vicinity object information from at least one of a radar apparatus 103 and a clearance sonar 104 that are installed on the host vehicle 9 separately from the image display system 10a to detect the position of the object. As a result, the position detector 202 detects the position of the object existing in the vicinity of the host vehicle 9.

Herein, the radar apparatus 103 is, for example, installed on a substantial center of a front bumper or a rear bumper of the host vehicle 9 and receives a reflected wave of a transmission wave reflected off the object. A plurality of clearance sonars 104 are installed in/on the front bumper and the rear bumper, or in areas close to the front bumper and the rear bumper of the host vehicle 9 and receive a reflected wave of a transmission wave reflected off the object.

Then, in accordance with the vicinity object information detected by the position detector 202, the image controller 201 retrieves one of plural polygonal models stored as host vehicle data 273, and places the retrieved polygonal model to a vehicle area R0 of a projection surface TS, and then generates a combined image by superimposing a host vehicle image on a vicinity image viewed from a virtual viewpoint.

Herein, the style form of the polygonal model retrieved from amongst the plural polygonal models is changed as the position of the object gets close to the host vehicle 9. For example, as the position of the object gets close to the host vehicle 9, the image controller 201 selects one polygonal model corresponding to the frame style of which the frame lines are thinner, from amongst the plurality of style forms. In other words, as the position of the object gets closer to the host vehicle 9, the image controller 201 makes the frame lines of the frame style thinner. Thus, a user can surely see the object on the screen, can see a distance between the host vehicle image and the object image on the screen more easily, and thus can understand an actual distance between the host vehicle and the object more correctly. As described above, as an object gets closer to the host vehicle 9, a degree of danger of a collision between the host vehicle 9 and an object becomes higher. However, as the degree of the danger of the collision between the host vehicle 9 and the object becomes higher, the user can set the style frame to see the object image more easily by making the frame lines shown in the frame style thinner.

Figure 14:
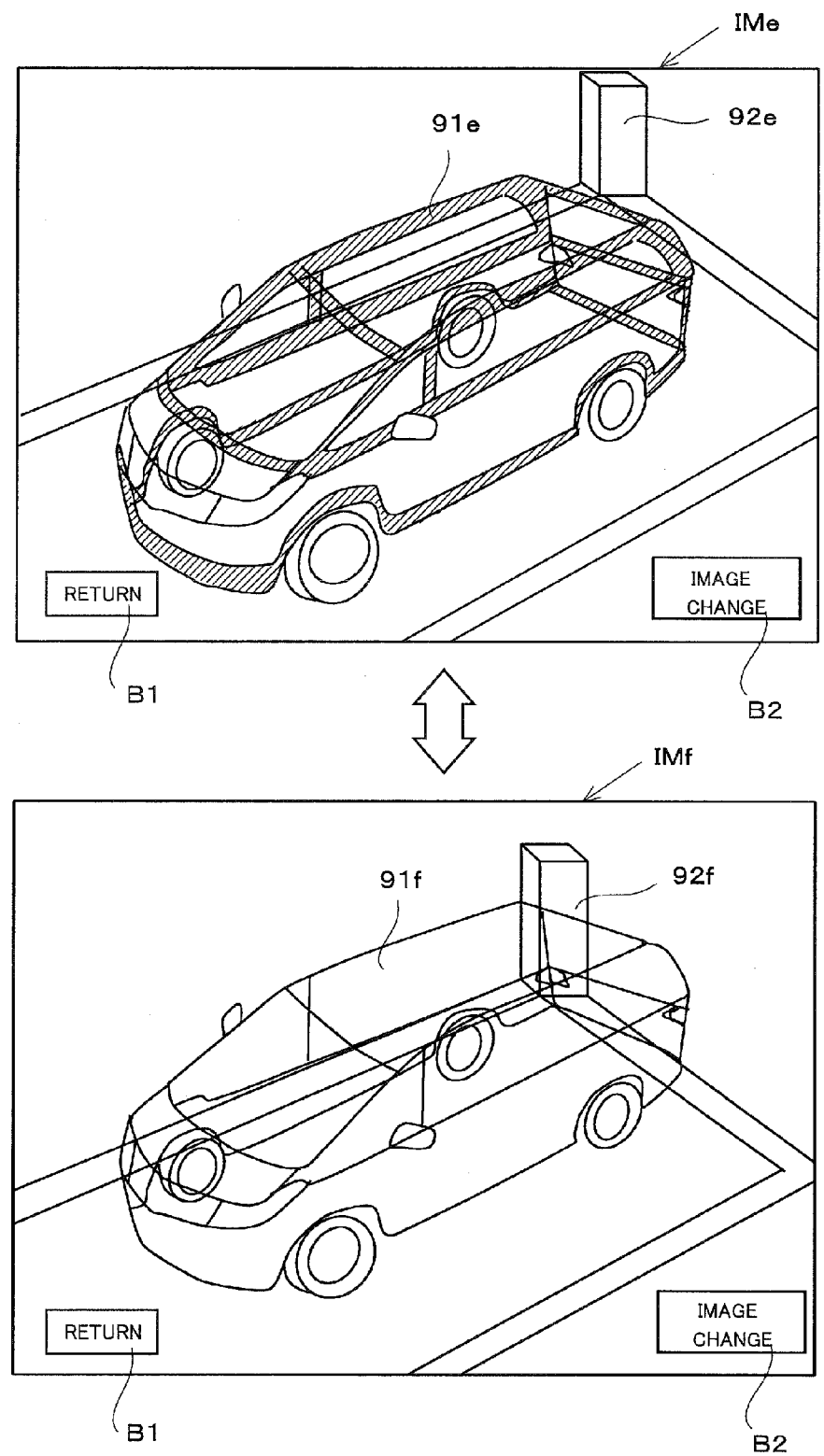
FIG. 14 illustrates a combined image in which thickness of frame lines is changed in accordance with a position of an object.

FIG. 14 illustrates a combined image in which thickness of the frame lines is changed in accordance with the position of the object. The upper drawing in FIG. 14 shows the combined image IMe including the host vehicle image in the frame style displayed when the position of the object is within a first range relative to the host vehicle 9 (e.g. a distance of the object relative to the host vehicle 9 is 20 m or less and over 5 m). Moreover, a lower drawing in FIG. 14 shows a combined image IMf including the host vehicle image in the frame style displayed when the position of the object is within a second range relative to the host vehicle 9 (e.g. a distance of the object relative to the host vehicle 9 is 5 m or less and over 1 m).

Moreover, the combined image IMe and the combined image IMf are the combined images including the host vehicle 9 viewed from a substantially same virtual viewpoint. The virtual viewpoint is a point located higher than a vehicle height in front left of the host vehicle 9, having a view direction looking backward on a right side.

Moreover, a thick-line frame image 91e corresponding to a thick-line polygonal model PGa is displayed in a substantial center of the combined image IMe shown in the upper drawing in FIG. 14. Moreover, the obstacle image 92e corresponding to an object (e.g. a utility pole, a pole, etc) on the right side behind the thick-line frame image 91e is displayed.

The position detector 202 detects the position of the object relative to the host vehicle 9 from image information obtained from the obstacle image 92e in the combined image IMe or from the vicinity object information obtained from at least one of the radar apparatus 103 and the clearance sonar 104, via the signal receiver 26. In accordance with the position of the object relative to the host vehicle 9 detected by the position detector 202, for example, when the object exists within in the first range, the image controller 201 retrieves the thick-line polygonal model PGa from amongst the plural polygonal models stored as host vehicle data 273, places the retrieved thick-line polygonal model PGa to the vehicle area R0 of the projection surface TS and then generates the combined image IMe by superimposing on the vicinity image the thick-line frame image 91e viewed from the virtual viewpoint. As a result, a display 3 displays the combined image IMe.

Next explained, with reference to the lower drawing in FIG. 14, is a case where the host vehicle 9 moves backward than the position of the host vehicle 9 in the upper drawing in FIG. 14 and gets closer to an obstacle. In the lower drawing in FIG. 14, a thin-line frame image 91f corresponding to a thin-line polygonal model PGb is displayed in a substantial center of the combined image IMf. Moreover, an obstacle image 92f corresponding to an object on a right side behind the thin-line frame image 91f.

The position detector 202 detects a position of the object relative to the host vehicle 9 from the image information obtained from the obstacle image 92f in the combined image IMf or from the vicinity object information obtained from at least one of the radar apparatus 103 and the clearance sonar 104. Then, in accordance with the position of the object relative to the host vehicle 9 detected by the position detector 202, for example, when the object exists within in the second range, the image controller 201 retrieves the thin-line polygonal model PGb from amongst the plural polygonal models stored as the host vehicle data 273, places the retrieved thin-line polygonal model PGb to the vehicle area R0 of the projection surface TS and then generates the combined image IMf by superimposing on the vicinity image the thin-line frame image 91f viewed from the virtual viewpoint. As a result, a display 3 displays the combined image IMf.

As described above, as the position of the object existing in the vicinity of the host vehicle 9 gets closer to the host vehicle 9, the image generating apparatus 2 makes the frame lines in the frame style thinner. Thus, the user can recognize the host vehicle image and the object image separately, can surely see the object image on the screen, can understand the distance between the host vehicle image and the object image on the screen more easily, and thus can understand the actual distance between the host vehicle 9 and the object more correctly.

4. Fourth Embodiment

Next, a fourth embodiment is explained. An image generating apparatus 2b of an image display system 10b in the fourth embodiment detects a position of an object existing in a vicinity of a host vehicle 9 from image information, information from different sensors, etc. Moreover, when the object is located close to the host vehicle 9, the image generating apparatus 2b changes a frame style for a portion of frame lines to a style form corresponding to the position of the object. In other words, when the object is located close to the host vehicle 9, the image generating apparatus 2b superimposes an indicative image (e.g. yellow indicative image on green frame lines) showing a user a portion to be paid attention to, on the portion of the frame lines corresponding to the position of the object. The object does not necessarily have to be located at an exact distance relative to the host vehicle 9, and the image generating apparatus 2b may change the style form for the frame lines when the object is located within a predetermined range relative to the host vehicle 9.

A configuration and procedure of the image display system 10b in the fourth embodiment are the substantially same as the configuration and the procedure of the image display system 10a in the third embodiment. However, as described above, the image display system 10b superimposes the indicative image showing the user the portion to be paid attention to, on the portion of the frame lines of a host vehicle image, in accordance with the position of the object. Therefore, at least a portion of the configuration is different from the configuration in the third embodiment. Thus, the difference is explained mainly with reference to FIG. 15 and FIG. 16.

Figure 15:
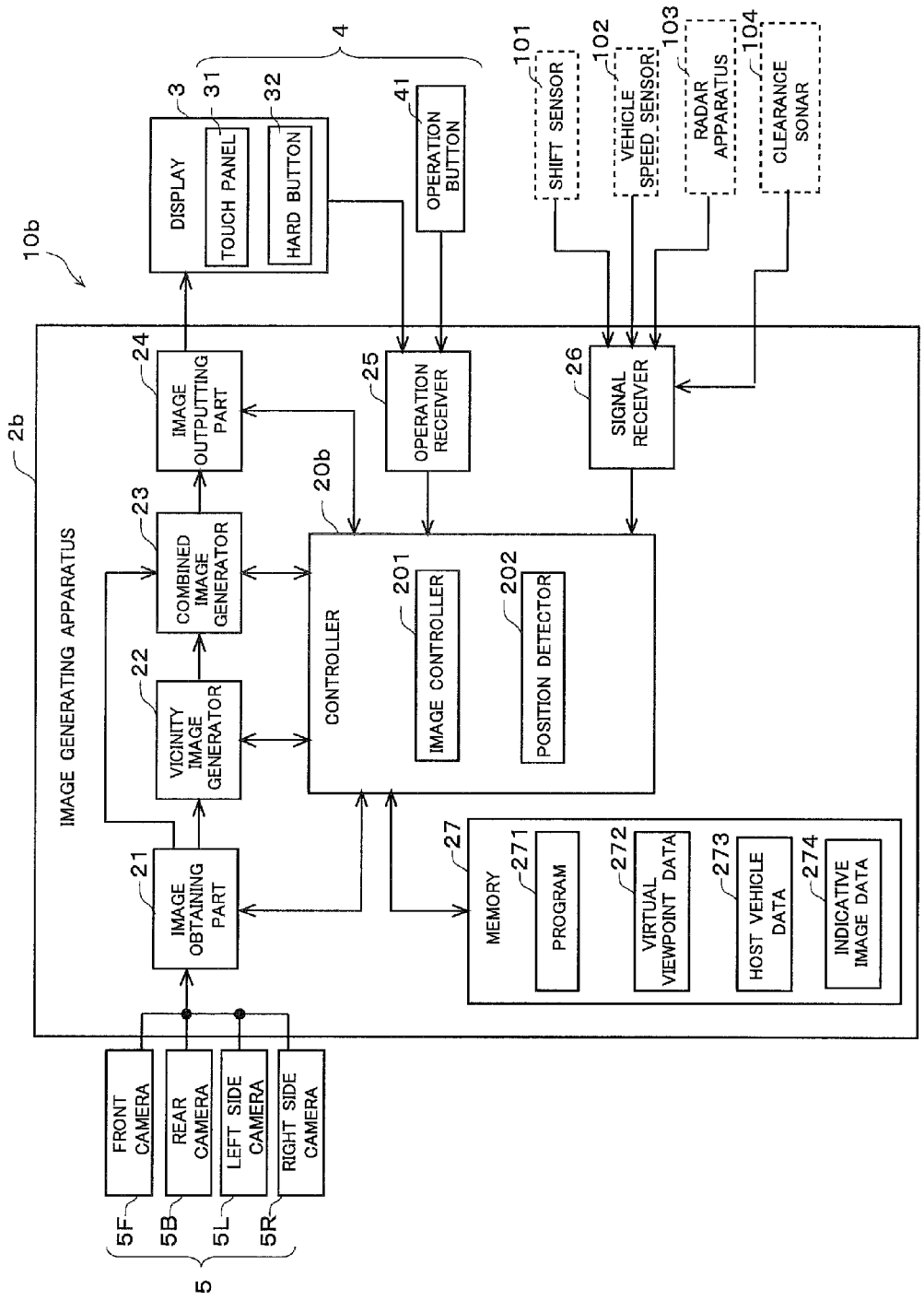
FIG. 15 is a diagram illustrating a configuration of an image display system.

FIG. 15 is a diagram illustrating the configuration of the image display system 10b. A memory 27 in the image generating apparatus 2b of the image display system 10b includes indicative image data 274. When the object detected by a position detector 202 is located close to the host vehicle 9, the indicative image data 274 is retrieved from the memory 27 under the control of an image controller 201. Then the indicative image is superimposed on the portion of the frame lines of the host vehicle image corresponding to the position of the object in a color different from a color of the portion. Thus, the user can correctly understand the position of the object relative to the host vehicle 9.

Figure 16:
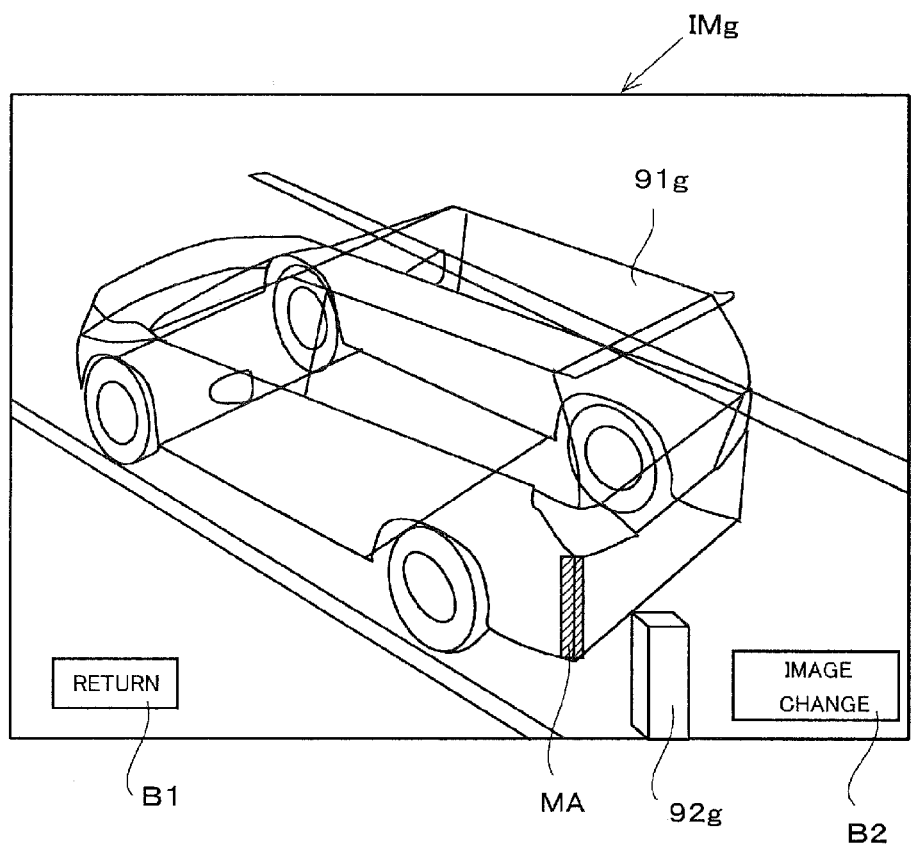
FIG. 16 illustrates a combined image showing a host vehicle image a portion of which is shown in a style form corresponding to a location of an object.

FIG. 16 illustrates a combined image IMg including a host vehicle image in which the portion of the frame lines is shown in the style form corresponding to the position of the object. The combined image IMg in FIG. 16 is a combined image generated by superimposing, on a vicinity image, the host vehicle image viewed from a virtual viewpoint located higher than a vehicle height on a left side behind the host vehicle 9, having a view direction looking forward on a right side of the host vehicle 9. Moreover, a thin-line frame image 91g corresponding to a thin-line polygonal model PGb is displayed in a substantial center of the combined image IMg in FIG. 16. Moreover, an obstacle image 92g corresponding to the object on the left side behind the thin-line frame image 91g is displayed.

The position detector 202 detects the position of the object relative to the host vehicle 9 from image information obtained from the obstacle image 92g in the combined image IMg or from vicinity object information obtained from at least one of a radar apparatus 103 and a clearance sonar 104, via the signal receiver 26. When the position of the object detected by the position detector 202 is located close to the host vehicle 9 (e.g. within 5 m), the image controller 201 superimposes an indicative image MA included in the indicative image data 274 on the portion of the frame lines corresponding to the position of the object, for a portion of a body frame of the host vehicle 9. For example, as shown in FIG. 16, the image controller 201 generates the combined image IMg by superimposing the indicative image MA on the frame lines corresponding to a left-side portion of the rear body of the thin-line frame image 91g. Then, a display 3 displays the combined image IMg. Thus, the user can correctly understand the position of the object relative to the host vehicle 9 and can confirm a portion of the host vehicle 9 to be paid attention to.

Each portion of the frame lines of the host vehicle image of which the style form is changed is determined beforehand for each position of an object. In a case of presence of an object close to the host vehicle 9, the style form for a portion of the frame lines of the host vehicle image is changed in accordance to the position of the object. Thus, the user can intuitively understand the position of the object relative to the host vehicle 9 and the portion of the host vehicle 9 to be paid attention to.

5. Modifications

The embodiments of the invention are explained above. However, the invention is not limited to the embodiments described above, and various modifications are possible. Hereinafter, examples of those modifications are explained. All the forms including the aforementioned embodiments and modifications explained below can be arbitrarily combined.

The aforementioned embodiments explain that the combined images including the vicinity image and the host vehicle image are generated mainly from the virtual viewpoint VP or VP1. However, a virtual viewpoint and a view direction other than the virtual viewpoints VP and VP1 may be used as long as an area behind the host vehicle viewed from the virtual viewpoint is displayed.

Moreover, a part of the functions performed by the controller 20 in the image generating apparatus 2 in the aforementioned embodiments may be performed by a controller in the display 3.

Furthermore, it is explained in the aforementioned embodiments that the different functions are performed by arithmetic processing performed by the CPU in accordance with a program. However, a part of the functions may be implemented by an electrical hardware circuit. On the other hand, a part of the functions performed by a hardware circuit in the aforementioned embodiments may be performed by software.

In addition, it is explained in the third and fourth embodiments that the image generating apparatus 2a and the image generating apparatus 2b obtain the vicinity object information from at least one of the radar apparatus 103 and the clearance sonar 104 via the signal receiver 26. However, a position of an object may be detected by obtaining the vicinity object information from an apparatus, a device, etc. other than the radar apparatus 103 and the clearance sonar 104.

Moreover, it is explained in the fourth embodiment that when an object is located close to the host vehicle 9, the indicative image is superimposed on the portion of the frame lines of the host vehicle image corresponding to the position of the object. In addition, the indicative image may not be superimposed continuously but may be repeatedly superimposed at intervals of a predetermined time period (e.g. 1 second). Thus, when the user sees the combined image IMg, the indicative image MA seems flashing on the screen. As a result, the user can more easily recognize the portion to be paid attention to. Furthermore, when an object is detected close to the host vehicle 9, a warning sound may be provided from a speaker, not illustrated in FIG. 15, included in the image generating apparatus 2b to the user, instead of the superimposition of the indicative image MA or along with the superimposition of the indicative image MA.

While the invention has been shown and described in detail, the foregoing description is in all aspects illustrative and not restrictive. It is therefore understood that numerous other modifications and variations can be devised without departing from the scope of the invention.

What is claimed is:

1. An image generating apparatus comprising:
    an obtaining part that obtains a captured image captured by a camera mounted on a vehicle; and
    a generator that generates a vicinity image including the vehicle and a vicinity of the vehicle viewed from a virtual viewpoint, based on the captured image, and that generates a combined image by superimposing a vehicle image of the vehicle on the vicinity image, wherein
    the generator:
        i) it generates the vehicle image in a frame style that shows in a three-dimensional manner one or more parts and a body frame which in combination, configure an outer shape of the vehicle by frame lines, wherein the one of more parts are different from the body frame of the vehicle and are components of the vehicle viewable from an outside of the vehicle, and wherein portions of the vehicle other than the body frame and the one or more parts are not shown in the frame style, and
        ii) changes a style form of the vehicle image in the frame style in accordance with a predetermined condition.

2. The image generating apparatus according to claim 1, wherein
    the generator generates the vehicle image in one style form selected in accordance with a user operation performed by a user of the vehicle, from amongst a plurality of the style forms which differ from each other in thickness of the frame lines.

3. The image generating apparatus according to claim 1, wherein
    the generator generates the vehicle image in the frame style or in a real image style, in accordance with a location of the virtual viewpoint.

4. The image generating apparatus according to claim 1, wherein
    the frame lines have a first side and a second side each of which is colored in a color different from each other; and
    the generator changes the style form of the frame lines shown in the combined image viewed from the virtual viewpoint, in the frame style, depending on whether the first side or the second side is viewable from the virtual viewpoint.

5. The image generating apparatus according to claim 1, further comprising:
    a detector that detects an object existing in the vicinity of the vehicle, wherein
    the predetermined condition is a position of the object such that the generator generates the vehicle image in one style form selected in accordance with the position of the object, from amongst the plurality of style forms.

6. The image generating apparatus according to claim 5, wherein
    as the position of the object gets closer to the vehicle, the generator makes the frame lines in the frame style thinner.

7. The image generating apparatus according to claim 1, further comprising:
    a detector that detects an object existing in the vicinity of the vehicle, wherein
    the predetermined condition is a position of the object such that the generator changes the style form of a portion of the frame lines in the frame style corresponding to the position of the object.

8. An image display system comprising:
    the image generating apparatus according to claim 1; and
    a display that displays the combined image output from the image generating apparatus.

9. An image generating method comprising the steps of:
    (a) obtaining a captured image captured by a camera mounted on a vehicle; and
    (b) generating a vicinity image including the vehicle and a vicinity of the vehicle viewed from a virtual viewpoint, based on the captured image, and generating a combined image by superimposing a vehicle image of the vehicle on the vicinity image, wherein
    the step (b) i) generates the vehicle image in a frame style that shows in a three-dimensional manner one or more parts and a body frame, which in combination, configure an outer shape of the vehicle by frame lines, wherein the one or more parts are different from the body frame of the vehicle and are components of the vehicle viewable from an outside of the vehicle, and wherein portions of the vehicle other than the body frame and the one or more parts are not shown in the frame style, and
        ii) changes a style form of the vehicle image in the frame style in accordance with a predetermined condition.

10. The image generating method according to claim 9, wherein
    the step (b) generates the vehicle image in one style form selected in accordance with a user operation performed by a user of the vehicle, from amongst a plurality of the style forms which differ from each other in thickness of the frame lines.

11. The image generating method according to claim 9, wherein
    the step (b) generates the vehicle image in the frame style or in a real image style, in accordance with a location of the virtual viewpoint.

12. The image generating method according to claim 9, wherein
    the frame lines have a first side and a second side each of which is colored in a color different from each other; and
    the step (b) changes the style form of the frame lines shown in the combined image viewed from the virtual viewpoint, in the frame style, depending on whether the first side or the second side is viewable from the virtual viewpoint.

13. The image generating method according to claim 9, further comprising:

(c) detecting an object existing in the vicinity of the vehicle, wherein the predetermined condition is a position of the object such that the step (b) generates the vehicle image in one style form selected in accordance with the position of the object, from amongst the plurality of style forms.

14. The image generating method according to claim 13, wherein as the position of the object gets closer to the vehicle, the step (b) makes the frame lines in the frame style thinner.

15. The image generating method according to claim 9, further comprising:

(d) detecting an object existing in the vicinity of the vehicle, wherein the predetermined condition is a position of the object such that the step (b) changes the style form of a portion of the frame lines in the frame style corresponding to the position of the object.

\* \* \* \* \*